(12) United States Patent
Otohata

(10) Patent No.: US 11,233,296 B2
(45) Date of Patent: Jan. 25, 2022

(54) ELECTRODE ASSEMBLY AND MANUFACTURING METHOD THEREFOR

(71) Applicant: NEC CORPORATION, Tokyo (JP)

(72) Inventor: Makihiro Otohata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 414 days.

(21) Appl. No.: 16/320,672

(22) PCT Filed: Jul. 20, 2017

(86) PCT No.: PCT/JP2017/026213
§ 371 (c)(1),
(2) Date: Jan. 25, 2019

(87) PCT Pub. No.: WO2018/021128
PCT Pub. Date: Feb. 1, 2018

(65) Prior Publication Data
US 2019/0157651 A1    May 23, 2019

(30) Foreign Application Priority Data

Jul. 26, 2016   (JP) .............................. JP2016-146514

(51) Int. Cl.
*H01M 2/26*   (2006.01)
*H01M 4/36*   (2006.01)
(Continued)

(52) U.S. Cl.
CPC ........... *H01M 50/531* (2021.01); *H01M 4/04* (2013.01); *H01M 4/13* (2013.01); *H01M 4/139* (2013.01);
(Continued)

(58) Field of Classification Search
CPC ....... H01M 4/04; H01M 4/13; H01M 10/0463; H01M 10/0585
See application file for complete search history.

(56) References Cited

U.S. PATENT DOCUMENTS

2003/0224242 A1   12/2003   Kaito et al.
2012/0276437 A1*  11/2012   Onishi .............. H01M 10/0585
                                               429/139
2013/0171370 A1*  7/2013    Legner ................ H01M 50/403
                                               427/535

FOREIGN PATENT DOCUMENTS

CN          100367541 C     2/2008
CN          101604746 A    12/2009
(Continued)

OTHER PUBLICATIONS

International Search Report for PCT/JP2017/026213 dated Oct. 3, 2017 [PCT/ISA/210].
(Continued)

*Primary Examiner* — Stephan J Essex
(74) *Attorney, Agent, or Firm* — Carl J Pellegrini

(57) ABSTRACT

A purpose of the present invention is to provide an electrode assembly and a manufacturing method therefor that can favorably suppress a short circuit that is due to a burr created by punching. At least one of the cathode 11 and the anode 12 of the electrode assembly of the present invention is covered with an insulating layer. The cathode 11 and the anode 12 are oriented such that the burr 11*b* of the cathode 11 and the burr 12*b* of the anode 12 of the opposing cathode 11 and the opposing anode 12 close to at least the outer peripheral edge of the cathode 11 and the outer peripheral edge of the anode 12 do not face each other 12 are opposed to each other.

9 Claims, 13 Drawing Sheets

(51) Int. Cl.
  *H01M 4/04* (2006.01)
  *H01M 10/0585* (2010.01)
  *H01M 50/531* (2021.01)
  *H01M 4/13* (2010.01)
  *H01M 10/04* (2006.01)
  *H01M 4/139* (2010.01)
  *H01M 10/052* (2010.01)
  *H01M 4/02* (2006.01)

(52) U.S. Cl.
  CPC ....... *H01M 4/366* (2013.01); *H01M 10/0463* (2013.01); *H01M 10/052* (2013.01); *H01M 10/0585* (2013.01); *H01M 2004/025* (2013.01)

(56) References Cited

FOREIGN PATENT DOCUMENTS

| CN | 105244470 A | | 1/2016 |
|---|---|---|---|
| JP | 2001203001 A | * | 7/2001 |
| JP | 2001-283897 A | | 10/2001 |
| JP | 2002-246032 A | | 8/2002 |
| JP | 2003-151542 A | | 5/2003 |
| JP | 2003-206475 A | | 7/2003 |
| JP | 2004-79500 A | | 3/2004 |
| JP | 2009-43641 A | | 2/2009 |
| JP | 2009-301765 A | | 12/2009 |
| JP | 2011-23334 A | | 2/2011 |
| JP | 2011-113843 A | | 6/2011 |
| JP | 2012-64313 A | | 3/2012 |
| JP | 2013-98022 A | | 5/2013 |
| JP | 2016-170909 A | | 9/2016 |

OTHER PUBLICATIONS

Written Opinion for PCT/JP2017/026213 dated Oct. 3, 2017 [PCT/ISA/237].
Chainese Office Action for CN Application No. 201780045970.5 dated Jun. 3, 2021 with English Translation.
Japanese Office Action for JP Application No. 2018-529816 dated Oct. 12, 2021 with English Translation.

* cited by examiner

ELECTRODE ASSEMBLY AND MANUFACTURING METHOD THEREFOR

CROSS REFERENCE TO RELATED APPLICATIONS

This application is a National Stage of International Application No. PCT/JP2017/026213, filed on Jul. 20, 2017, which claims priority from Japanese Patent Application No. 2016-146514, filed on Jul. 26, 2016, the disclosures of which are incorporated herein in their entirety.

TECHNICAL FIELD

The present invention relates to an electrode assembly for a battery and a manufacturing method thereof, and more particularly, to an electrode assembly including an electrode in which an active material layer and an insulation layer are layered on the surface of a current collector, and a manufacturing method thereof.

BACKGROUND ART

Secondary batteries are widely used as power supplies for portable electronic devices such as smart phones, tablet computers, notebook computers, or digital cameras, and applications thereof have further expanded to power supplies for electric vehicles or power supplies for home use. Among them, lithium ion secondary batteries with high energy density and lightweight are energy storage devices indispensable for modern life.

Secondary batteries of this kind generally have a structure in which an electrode assembly in which a cathode and an anode face one another via a separator is enclosed in a packaging body together with an electrolyte. Each of a cathode and an anode has a structure in which an active material layer is formed in a predetermined region on both sides of a sheet-like current collector, and is usually formed into a predetermined shape having an extended portion for current extraction by punching after forming the active material layers. Usually, an active material layer is not formed on the extended portion for current extraction.

Punching is a technique of applying a shearing force to a workpiece by a die and a punch and cutting the workpiece by the shearing force. Therefore, a burr is created, by punching, on the cut section of an electrode, particularly at a current collector portion. The height of a burr (the length of a burr in the thickness direction of an electrode) depends on the material of a current collector, a clearance between a die and a punch, or the like. In cases in which the height of a burr is too high, when a cathode and an anode are layered via a separator, the burr may penetrate the separator, and a short circuit may occur between the cathode and the anode.

In view of this, PTL 1 (Japanese Unexamined Patent Application Publication No. 2001-283897) describes that a separator has a multilayer structure at a portion corresponding to a cut section of an electrode, and that a short circuit due to a burr is prevented by making the thickness of the separator sufficiently thick at a portion where a burr is created.

On the other hand, a polyolefin microporous sheet made of polypropylene or polyethylene is often used as a separator. However, the melting points of polypropylene and polyethylene are typically from 110° C. to 160° C. Therefore, when a polyolefin separator is used in a battery with a high energy density, the separator melts when the temperature of the battery is high, and a short circuit may occur between electrodes over a wide area.

Therefore, in order to improve the safety of a battery, it has been proposed to form an insulation layer on at least one of a cathode and an anode. For example, PTL 2 (Japanese Unexamined Patent Application Publication No. 2009-43641) describes an anode for a battery having an anode active material layer formed on the surface of an anode current collector, wherein a porous layer is formed on the surface of the anode active material layer. PTL 3 (Japanese Unexamined Patent Application Publication No. 2009-301765) also describes an electrode in which similarly a porous protective film is provided on the surface of an active material layer formed on a current collector. By forming an insulation layer, it is possible to suppress the influence of a margin of a separator, and there is a possibility that the use of a separator becomes unnecessary.

CITATION LIST

Patent Literature

[PTL 1] Japanese Unexamined Patent Application Publication No. 2001-283897
[PTL 2] Japanese Unexamined Patent Application Publication No. 2009-43641
[PTL 3] Japanese Unexamined Patent Application Publication No. 2009-301765

SUMMARY OF THE INVENTION

Technical Problem

The height of a burr created on the cut section of an electrode depends on the size of a clearance between a die and a punch, and the height of the burr can be suppressed by making the clearance as small as possible.

However, in actual punching processing, usually, the thicker a workpiece is, the larger a clearance is set. In a punching process for forming an electrode into a predetermined shape, the thickness varies depending on a location to be processed, and, normally, the size of a clearance according to the location to be processed is not set. Therefore, it is difficult to suppress the height of a burr generated to an extent that the burr contacts a separator (insulation layer in the case of an electrode having an insulation layer) but does not reach an active material layer or a current collector of each of facing electrodes by optimally setting a clearance.

Even when the height of a burr can be suppressed, both end edges of an extended portion in the width direction, for example, at a section where an extended portion for current extraction is positioned, have a positional relationship in which the end edges intersect one side of an electrode adjacent in the facing direction of a cathode and an anode. Therefore, at the section, in cases in which both the cathode and the anode facing one another have burrs, and the cathode and the anode are arranged in such a manner that the burrs extend toward each other, even when the heights of the respective burrs are within an allowable range, there is a possibility that the facing burrs come into contact with each other, resulting in short circuit between the cathode and the anode.

An object of the present invention is to provide an electrode assembly capable of favorably suppressing a short circuit due to a burr created by punching, and a manufacturing method thereof.

Solution to the Problem

The present invention is an electrode assembly for a battery, including:

at least one cathode including a cathode current collector and a cathode active material layer formed in a predetermined area on at least one side of the cathode current collector, having a burr formed by a punching process, and formed in a predetermined shape; and at least one anode positioned facing the cathode, including an anode current collector and an anode active material layer formed in a predetermined area on at least one side of the anode current collector, having a burr formed by a punching process, and formed in a predetermined shape, wherein at least one of the cathode and the anode further includes an insulation layer that is formed covering the active material layer, and at a section of the facing cathode and anode where at least a peripheral edge of the cathode and a peripheral edge of the anode are adjacent, the cathode and the anode are facingly positioned in an orientation such that the burr of the cathode and the burr of the anode do not face one another.

The battery according to the present invention is a battery including:

the electrode assembly according to the present invention;

an electrolyte; and a packaging body for sealing the electrode assembly and the electrolyte.

The present invention is a method of manufacturing an electrode assembly for a battery, including:

a process of preparing a cathode including a cathode current collector and a cathode active material layer formed in a predetermined area on at least one side of the cathode current collector; and a process of preparing an anode including an anode current collector and an anode active material layer formed in a predetermined area on at least one side of the anode current collector, wherein at least one of the cathode and the anode further includes an insulation layer that is formed covering the active material layer, and further including:

a process of forming the cathode in a predetermined shape by punching;

a process of forming the anode in a predetermined shape by punching; and, a process of facingly positioning, at a section of the facing cathode and anode where at least a peripheral edge of the cathode and a peripheral edge of the anode are adjacent, the cathode and the anode in an orientation such that burrs created by the cutting do not face one another.

Advantageous Effects of the Invention

According to the present invention, a short circuit between a cathode and an anode due to contact of a burr caused by punching of electrodes can be suppressed by regulating the orientation of the burr.

EXAMPLE EMBODIMENT

Figure 1:
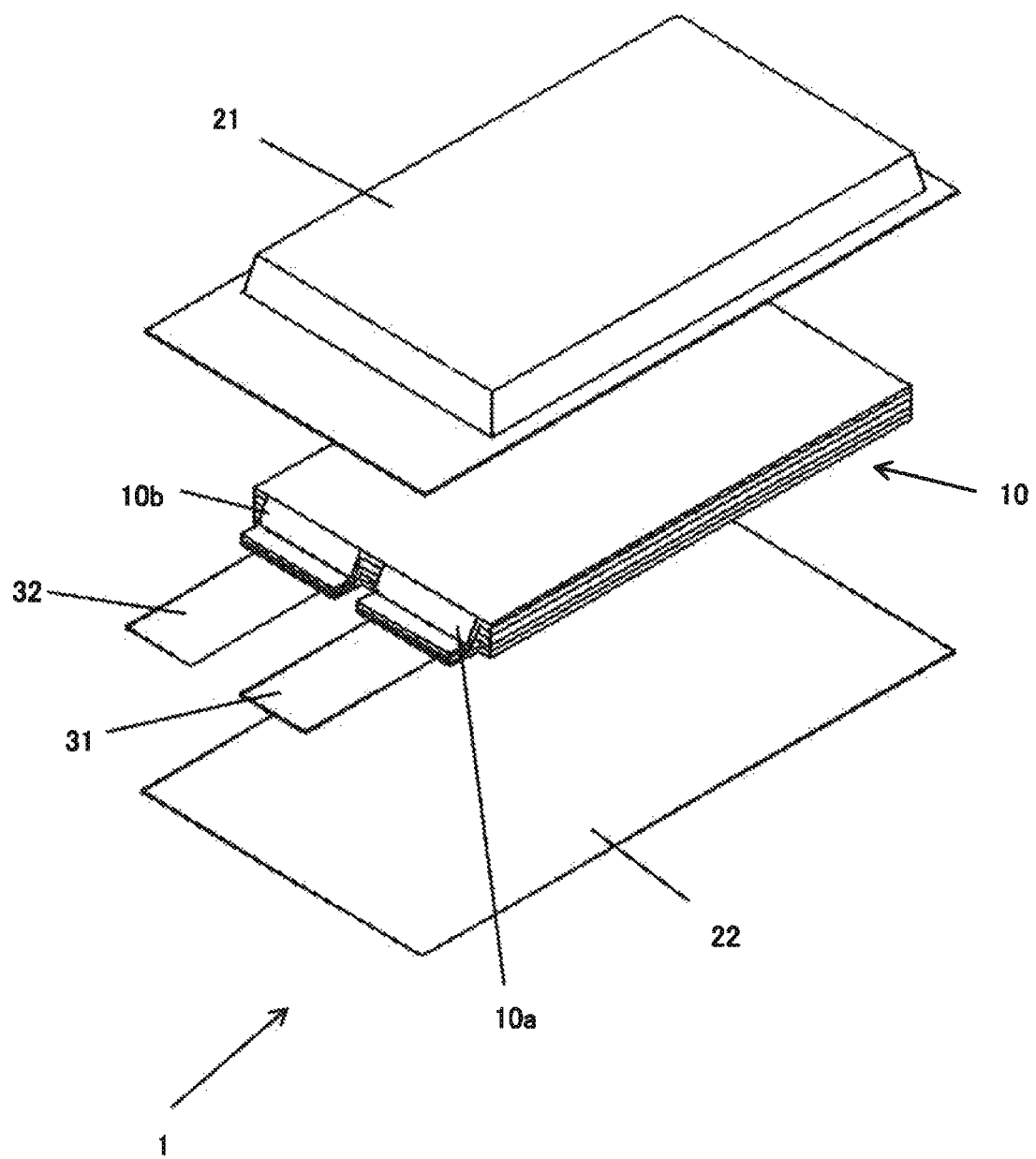
FIG. 1 is an exploded perspective view of a battery according to one example embodiment of the present invention.

Referring to FIG. 1, there is illustrated an exploded perspective view of a battery 1 according to one example embodiment of the present invention, including an electrode assembly 10 and a packaging body enclosing the electrode assembly 10 together with an electrolyte. The packaging body includes packaging members 21 and 22 that enclose the electrode assembly 10 by sandwiching from both sides in the thickness direction, and seal the electrode assembly 10 by joining peripheries thereof one another. Each of the cathode terminal 31 and the anode terminal 32 is connected to the electrode assembly 10 in such a manner that a part thereof protrudes from the packaging body.

Figure 2:
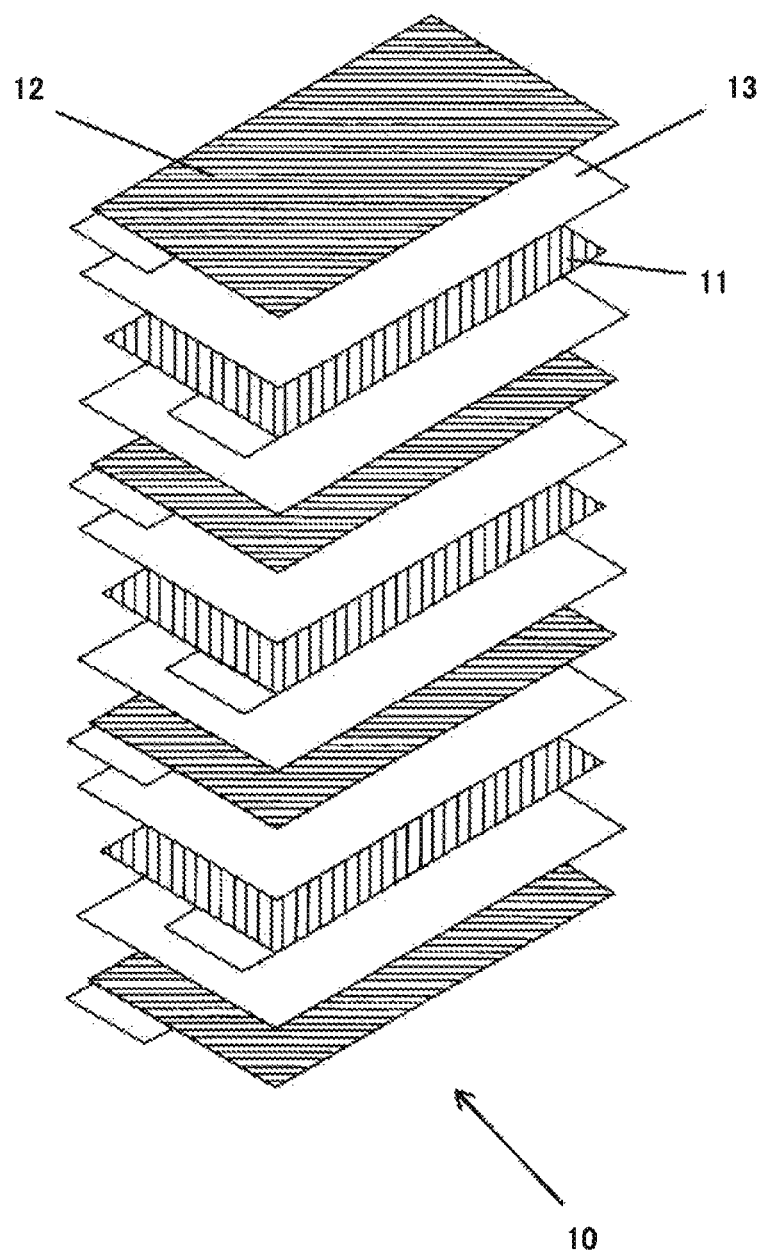
FIG. 2 is an exploded perspective view of an electrode assembly illustrated in FIG. 1.

As illustrated in FIG. 2, the electrode assembly 10 has a configuration in which a plurality of cathodes 11 and a plurality of anodes 12 are facingly positioned in such a manner to be alternately located. Between the cathode 11 and the anode 12, a separator 13 for preventing a short circuit between the cathode 11 and the anode 12 while ensuring ionic conduction between the cathode 11 and the anode 12 is arranged, if necessary, according to the structures of the cathode 11 and the anode 12.

The structures of the cathode 11 and the anode 12 will be described with further reference to FIG. 3A. The structure illustrated in FIG. 3A does not particularly distinguish the cathode 11 and the anode, and is a structure that can be applied to either the cathode 11 or the anode 12. The cathode 11 and the anode 12 (collectively referred to as "electrodes" when they are not distinguished from one another) includes a current collector 110 that can be formed of a metal foil, and an active material layer 111 formed on one side or both sides of the current collector 110. The active material layer 111 is preferably formed in a rectangular shape in plan view, and the current collector 110 has a shape having an extended portion 110a extending from a region where the active material layer 111 is formed.

In the cathode 11 and the anode 12, the positions where the extended portions 110a are formed are different from each other. Specifically, the position of the extended portion 110a of the cathode 11 and the position of the extended portion 110a of the anode 12 do not overlap one another when the cathode 11 and the anode 12 are layered. Note that the extended portions 110a of the cathodes 11 and the extended portions 110a of the anodes 12 are located at mutually overlapping positions. With such arrangement of the extended portions 110a, the plurality of cathodes 11 form a cathode tab 10a by collecting the respective extended portions 110a together and welding. Similarly, a plurality of anodes 12 form an anode electrode tab 10b by collecting the respective extended portions 110a together and welding. The cathode terminal 31 is electrically connected to the cathode tab 10a, and the anode terminal 32 is electrically connected to the anode tab 10b.

At least one of the cathode 11 and the anode 12 further includes an insulation layer 112 formed on the active material layer 111. The insulation layer 112 is formed in an area that covers the active material layer 111 in such a manner that the active material layer 111 is not exposed in plan view. In cases in which the active material layer 111 is formed on both sides of the current collector 110, the insulation layer 112 may be formed on both of the active material layers 111 or only on one of the active material layers 111.

Figure 3A:
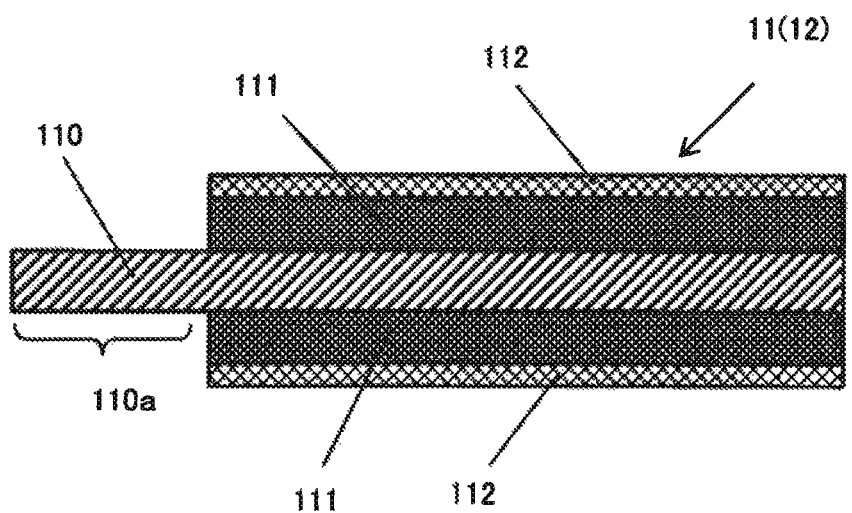
FIG. 3A is a schematic sectional view illustrating a structure of a cathode and an anode illustrated in FIG. 2.
Figure 3B:
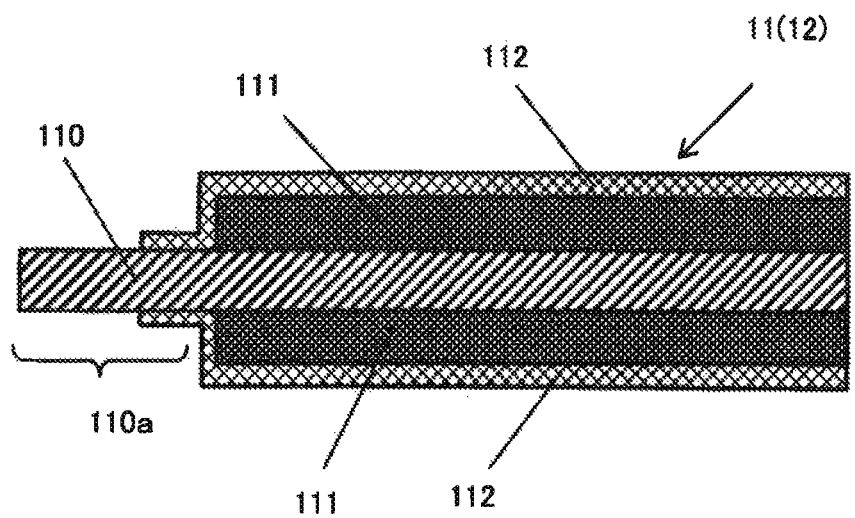
FIG. 3B is a schematic sectional view illustrating a structure of another configuration of the cathode and the anode illustrated in FIG. 2.

In the configuration illustrated in FIG. 3A, the insulation layer 112 is not formed in the extended portion 110a. However, as illustrated in FIG. 3B, the insulation layer 112 may be formed covering not only the active material layer 111 but also a part of the extended portion 110a.

Figure 4A:
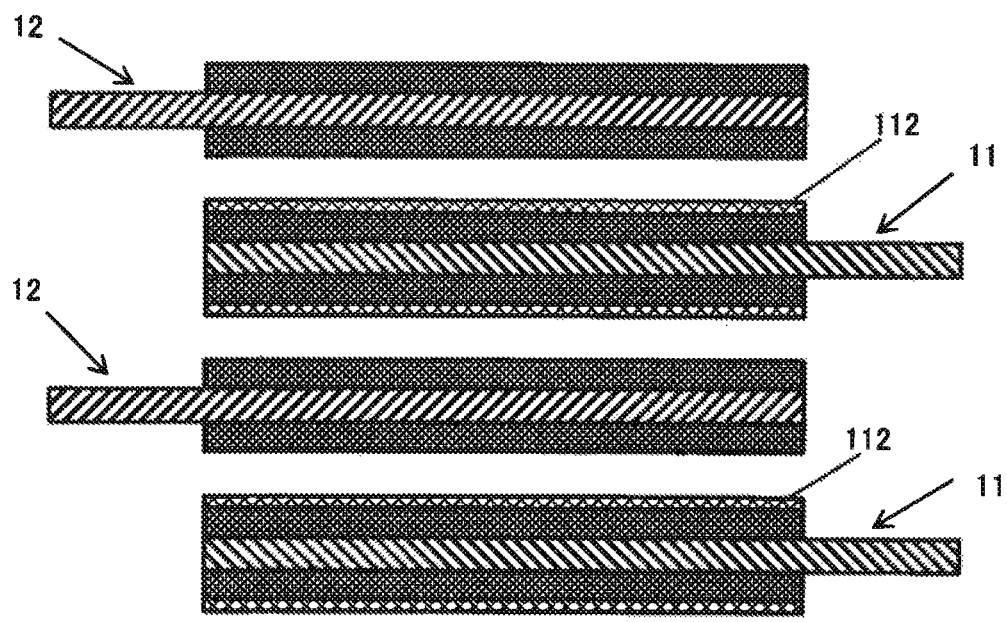
FIG. 4A is a sectional view illustrating an example of arrangement of a cathode and an anode in a case in which the cathode and the anode having different structures are used in the electrode assembly illustrated in FIG. 1.
Figure 4B:
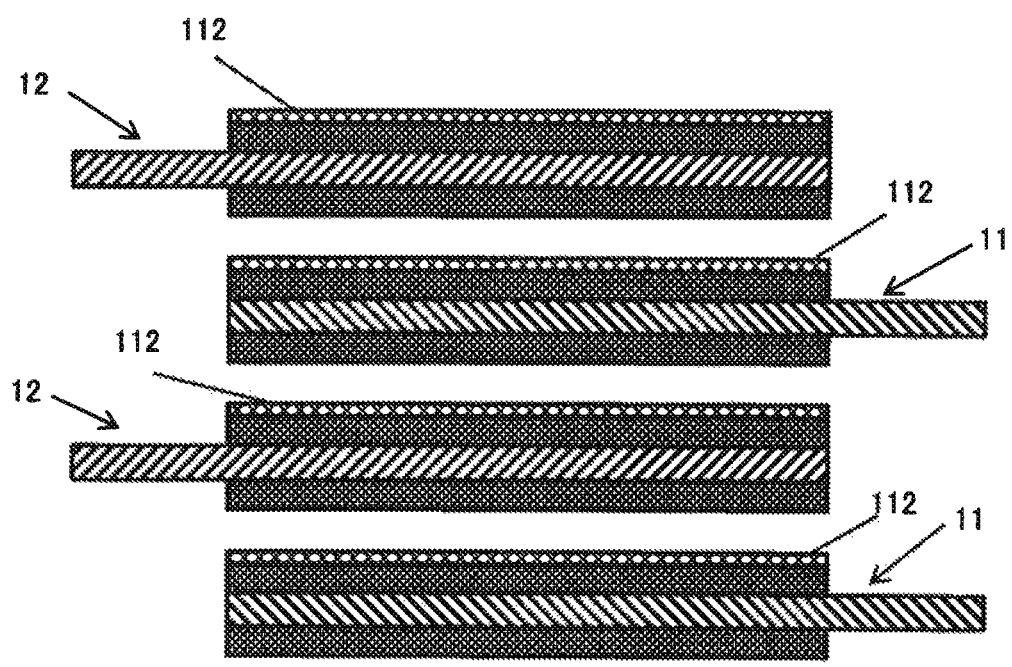
FIG. 4B is a sectional view illustrating another example of arrangement of a cathode and an anode in a case in which the cathode and the anode having different structures are used in the electrode assembly illustrated in FIG. 1.
Figure 4C:
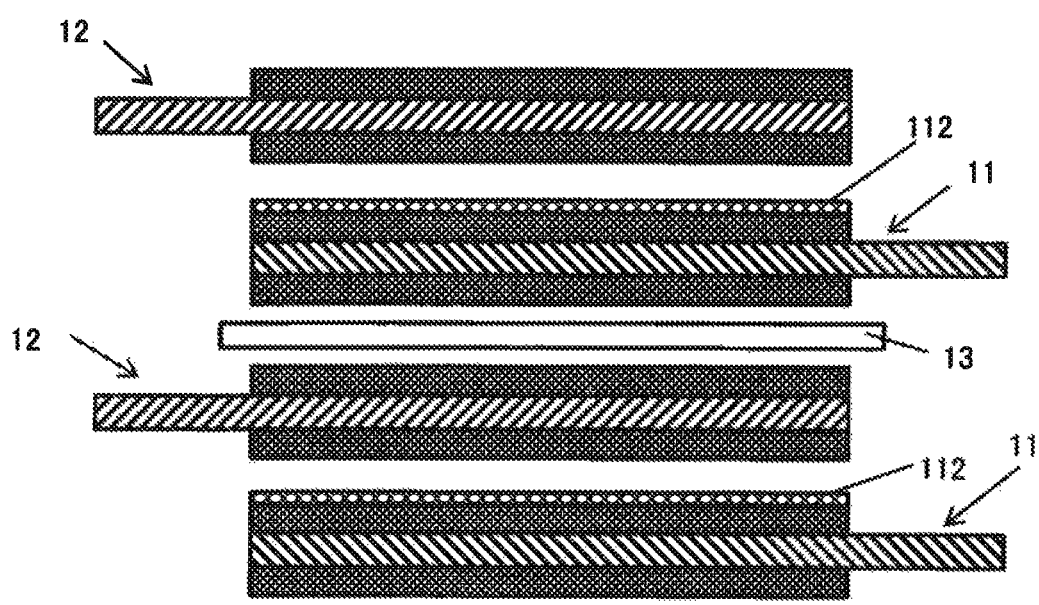
FIG. 4C is a sectional view illustrating still another example of arrangement of a cathode and an anode in a case in which the cathode and the anode having different structures are used in the electrode assembly illustrated in FIG. 1.

Some examples of the arrangement of the cathode 11 and the anode 12 in the electrode assembly 10 in which at least one of the cathode 11 and the anode 12 have the insulation layer 112 are illustrated in FIGS. 4A to 4C. In the arrangement illustrated in FIG. 4A, the cathode 11 including the insulation layer 112 on both sides and the anode 12 not including the insulation layer are alternately layered. In the arrangement illustrated in FIG. 4B, the cathode 11 and the anode 12 including the insulation layer 112 on only one side are alternately layered in such a manner that the respective insulation layers 112 do not face one another. In the structures illustrated in FIGS. 4A and 4B, since the insulation layer 112 exists between the cathode 11 and the anode 12, the separator 13 (see FIG. 2) can be made unnecessary.

On the other hand, in the arrangement illustrated in FIG. 4C, the cathode 11 having the insulation layer 112 on only one side and the anode 12 not including the insulation layer are alternately layered. In this case, the separator 13 is required between the cathode 11 and the anode 12 facing the surface not having the insulation layer 112. However, since the separator 13 can be made unnecessary between the cathode 11 and the anode 12 facing the surface including the insulation layer 112, the number of the separators 13 can be reduced by that amount.

The structure and arrangement of the cathode 11 and the anode 12 are not limited to the above examples and various modifications are possible as long as the insulation layer 112 is provided on at least one side of at least one of the cathode 11 and the anode 12. For example, in the structures illustrated in FIGS. 4A to 4C, the relationship between the cathode 11 and the anode 12 can be reversed.

Since the electrode assembly 10 having a planar layered structure as illustrated has no portion having a small curvature radius (a region close to a winding core of a winding structure), the electrode assembly has an advantage that it is less susceptible to a volume change of the electrode due to charging and discharging as compared with an electrode assembly having a winding structure. In other words, such an electrode assembly is effective for an electrode assembly using an active material that is prone to volume expansion.

In the configurations illustrated in FIGS. 1 and 2, the cathode terminal 31 and the anode terminal 32 are led out in the same direction, but the leading out directions of the cathode terminal 31 and the anode terminal 32 may be arbitrary. For example, the cathode terminal 31 and the anode terminal 32 may be led out in opposite directions from opposite sides of the electrode assembly 10, or may be led out in mutually orthogonal directions from two adjacent sides of the electrode assembly 10. In either case, the cathode tab 10a and the anode tab 10b can be formed at positions corresponding to the direction in which the cathode terminal 31 and the anode terminal 32 are led out.

In the illustrated configuration, an electrode assembly 10 having a layered structure including a plurality of cathodes 11 and a plurality of anodes 12 is illustrated. However, the electrode assembly may have a winding structure. In the electrode assembly having a winding structure, the number of cathodes 11 and the number of anodes 12 are each one.

A first important point in the embodiment is that the cathode 11 and the anode 12 are formed in a predetermined shape by punching. By forming the cathode 11 and the anode 12 in a predetermined shape by punching, a burr is created on a peripheral edge of the cathode 11 and a peripheral edge of the anode 12.

A second important point in the embodiment is that the cathode 11 and the anode 12 are arranged in a section where at least a peripheral edge of the cathode 11 and a peripheral edge of the anode 12 of the facing cathode and anode are adjacent in such a manner that a burr of the cathode 11 and a burr of the anode 12 do not face one another. Note that, in the embodiment, the term "adjacent" means that there is no other member between a peripheral edge of the cathode 11 and a peripheral edge of the anode 12 and that there is a positional relationship close enough that a peripheral edge of the cathode 11 and a peripheral edge of the anode 12 may come into contact with one another, and the term includes a state in which a peripheral edge of the cathode 11 and a peripheral edge of the anode 12 are in contact with one another.

Here, "a positional relationship close enough to make contact" means a positional relationship close to a degree that when the cathode 11 and the anode 12 are faced and constitute the electrode assembly 10, a peripheral edge of the cathode 11 and a peripheral edge of the anode 12 are not in contact with one another under usual use conditions, and there is a possibility of contact due to the relative position of the cathode 11 and the anode 12 being shifted by manufacturing error (dimensional tolerance), bending of the extended portion 110a (see FIG. 3A) for constituting the cathode tab 10a and the anode tab 10b (see FIG. 1), or the like. In consideration of manufacturing error and bending, even when a peripheral edge of the cathode 11 and a peripheral edge of the anode 12 are not in contact with one another, if the distance between the edges is, for example, 3.5 mm or less, it can be said that the peripheral edge of the cathode 11 and the peripheral edge of the anode 12 are in a positional relationship close enough to come into contact with one another.

For example, the electrode assembly 10 in which at least one of the cathode 11 and the anode 12 includes an insulation layer 112, and the cathode 11 and the anode 12 are facingly positioned without interposing a separator is considered.

Figure 5:
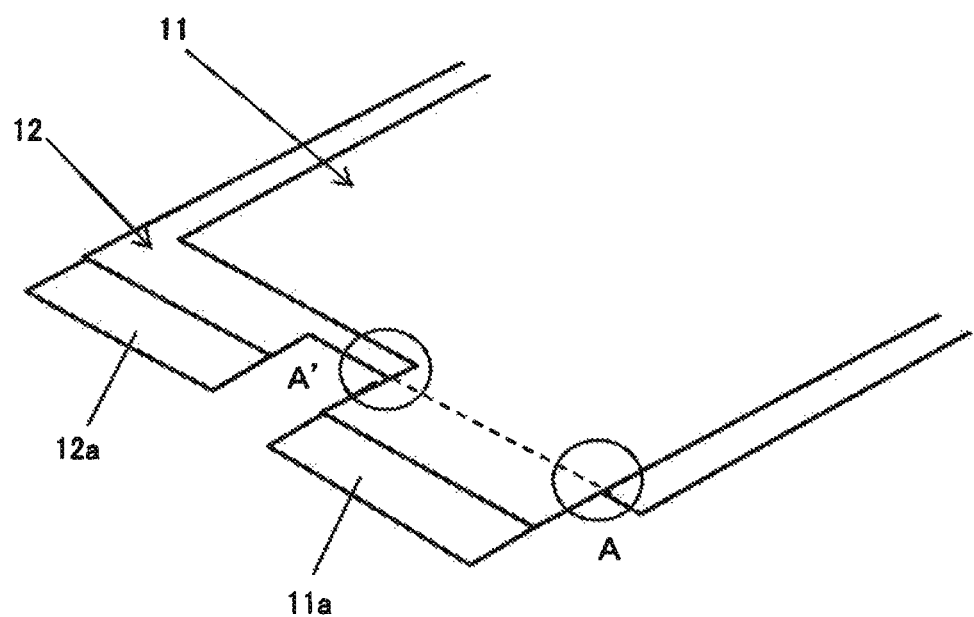
FIG. 5 is a perspective view of an essential part illustrating an example of a positional relationship between a cathode and an anode in an electrode assembly in which at least one of the cathode and the anode has an insulation layer, and the cathode and the anode are facingly positioned without interposing a separator.

FIG. 5 illustrates an example of a positional relationship between the cathode 11 and the anode 12 of such an electrode assembly 10. In the example illustrated in FIG. 5, each of the cathode 11 and the anode 12 is punched into a shape having extended portions 11a and 12a for current extraction, and the area of the anode 12 is larger than the area of the cathode 11. It is assumed that the cathode 11 and the anode 12 have the structure illustrated in FIG. 3B. Accordingly, the extended portions 11a and 12a of the cathode 11 and the anode 12 correspond to the extended portion 110a of the current collector 110 illustrated in FIG. 3B, and although the active material layer 111 is not formed in the extended portion 110a, the insulation layer 112 extends to a part of the extended portion 110a.

Figure 6:
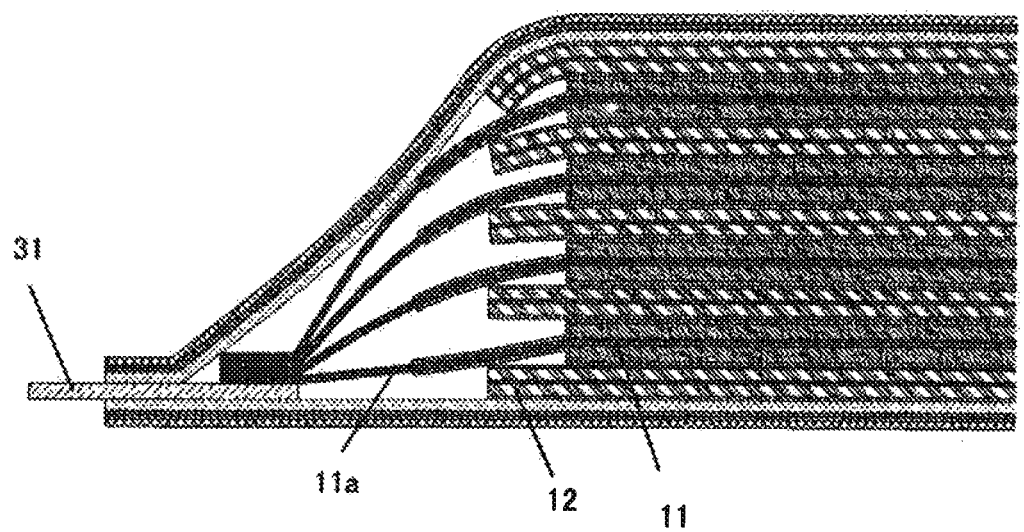
FIG. 6 is a sectional view of an essential part of a battery configured using the cathode and the anode illustrated in FIG. 5, taken along an extended portion of the cathode.

In such a configuration, when viewed from the facing direction of the cathode 11 and the anode 12, the extended portion 11a of the cathode 11 extends in such a manner to intersect a peripheral edge of the anode 12, and the facing peripheral edge of the cathode 11 and peripheral edge of the anode 12 are adjacent at this section (A portion and A' portion in FIG. 5). Since an active material layer is not formed on the extended portion 11a of the cathode 11, the thickness is thinner than the other portions by that amount. Therefore, if the cathode 11 and the anode 12 are merely arranged in such a manner to overlap with one another, a portion of the cathode 11 and a portion of the anode 12 close to one another do not come into contact with one another. However, when actually assembled as a battery, as illustrated in FIG. 6, the extended portion 11a of the cathode 11 is collected together and joined to the cathode terminal 31, and is deformed in a direction in which the cathode 11 and the anode 12 are faced. As a result, the extended portion 11a of the cathode 11 contacts a peripheral edge of the anode 12. However, since at least one of the cathode 11 and the anode 12 (both the cathode 11 and the anode 12 in the example illustrated in FIG. 6) is formed with an insulation layer, normally, short circuit does not occur even when the cathode 11 and the anode 12 come into contact with one another in this section.

Figure 7A:
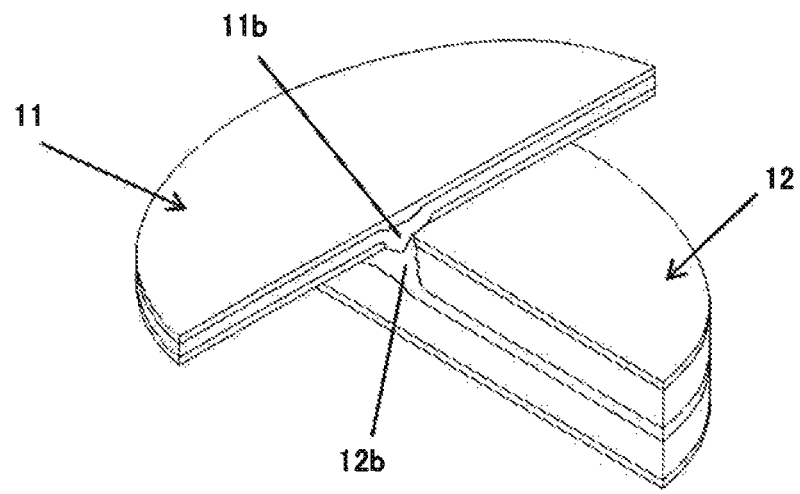
FIG. 7A is an enlarged view of a portion A illustrated in FIG. 5 in a state in which the cathode and the anode are facingly positioned in orientations such that the burr of the cathode and the burr of the anode face one another.

However, the cathode 11 and the anode 12 are formed by punching, and a cut section by punching appears on a peripheral edge. On the cut section by punching, a burr is usually created. Here, as illustrated in FIG. 7A which is an enlarged view of the A portion in FIG. 5, if the cathode 11 and the anode 12 are faced in such orientations that a burr 11b of the cathode 11 and a burr 12b of the anode 12 are faced at a section where a peripheral edge of the cathode 11 (here, peripheral edge of the extended portion 11a) and the peripheral edge of the anode 12 are adjacent, depending on the positions and sizes of the burrs 11b and 12b, the burrs 11b and 12b may come into contact with one another, and a short circuit may occur.

Figure 7B:
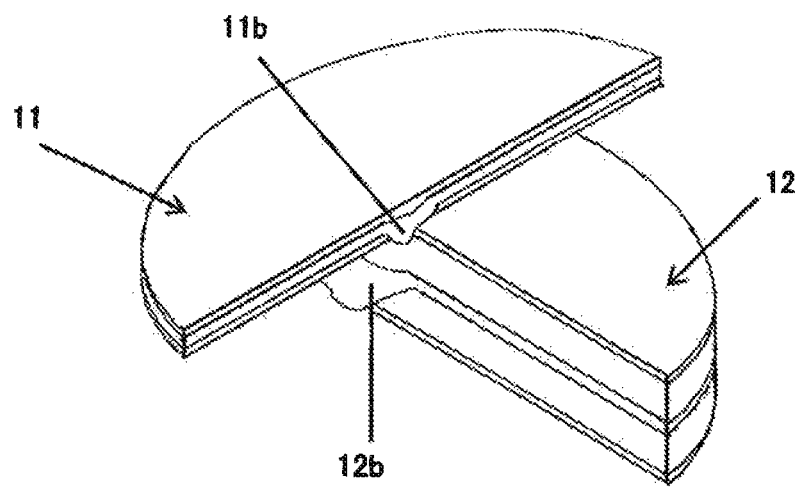
FIG. 7B is an enlarged view of a portion A illustrated in FIG. 5 in a state in which the cathode and the anode are facingly positioned by aligning the orientation of the burr of the cathode and the orientation of the burr of the anode.

Therefore, for example, as illustrated in FIG. 7B, by facingly positioning the cathode 11 and the anode 12 with the orientations of the burrs 11b and 12b aligned in the same direction, it is possible to prevent a short circuit due to contact between the burrs 11b and 12b. As will be described below with reference to FIGS. 8A to 8D, a long current collector is punched out, and a cathode 11 and an anode 12 in the shape illustrated in FIG. 2 are formed. In order to align the orientations of the burrs 11b and 12b in the same direction, punching is performed from the same direction with respect to the layering direction of the cathode 11 and the anode 12, and alternately layering interposing a separator while keeping the orientations of the plurality of formed cathodes 11 and anodes 12 same.

Although FIG. 7B illustrates the example in which the cathode 11 and the anode 12 are facingly positioned in such a manner that the orientations of the burrs 11b and 12b are aligned, if the burrs 11b and 12b do not face one another, the cathode 11 and the anode 12 may be facingly positioned in such a manner that the orientations of the burrs 11b and 12b are opposite to one another. In the case of layering a plurality of sheets, the anode 12 closest to the packaging member is oriented in such a direction in which the burr 12b faces a packaging member, and the cathode 11 facing the anode 12 is oriented in such a direction in which the burr 11b faces the inside of a battery. The orientations of burrs of the other cathodes and anodes are all set to the same orientation as an anode facing the cathode at the end. Alternatively, the orientations of burrs of a pair of a cathode and an anode which are not closest to a packaging member are reversed, and the orientation of a burr of an anode or a cathode of each of the other electrode pairs is the same as the orientation of a burr of the closer electrode of the pair of electrodes having the burrs with opposite orientations. When the orientations of the burrs of the cathode and the anode are reversed, management of the orientations of burrs 11b and 12b when manufacturing an electrode assembly becomes complicated. In consideration of this, it is preferable to arrange the cathode 11 and the anode 12 in such a manner that the orientations of the burrs 11b and 12b are aligned.

In the above described example, cases in which the area of the anode 12 is larger than the area of the cathode 11 have been described, but the relationship between the cathode 11 and the anode 12 may be reversed. Further, for example, when the cathode 11 and the anode 12 have the same shape and the same area, or when the cathode 11 and the anode 12 are facingly positioned with at least one side thereof aligned, the cathode 11 and the anode 12 are adjacent with their peripheral edges parallel to one another on at least one corresponding side. Also in this case, the cathode 11 and the anode 12 are facingly positioned in such an orientation that the burrs 11b and 12b do not face one another at adjacent sides of the cathode 11 and the anode 12.

Here, each element and an electrolyte constituting the electrode assembly 10 will be described in detail.

In the following description, each element in a lithium ion secondary battery, although not particularly limited thereto, will be described.

[1] Anode

An anode has a structure in which, for example, an anode active material is bonded to an anode current collector by an anode binding agent, and the anode active material is layered on the anode current collector as an anode active material layer. Any material can be used for the anode active material in the present example embodiment as long as the material is a material capable of reversibly occluding and releasing lithium ions as charging and discharging, and as long as an effect of the present invention is not significantly impaired. Normally, as in the case of the cathode, an anode having an anode active material layer formed on a current collector is used. As with the cathode, an anode may also include another layer if necessary.

The anode active material is not particularly limited as long as the material is a material capable of occluding and releasing lithium ions, and a known anode active material can be arbitrarily used. For example, it is preferable to use a carbonaceous material such as coke, acetylene black, mesophase microbead, or graphite; lithium metal; lithium alloy such as lithium-silicon, or lithium-tin, or lithium titanate. Among these, a carbonaceous material is most preferably used from the viewpoint of favorable cycle characteristics and safety as well as excellent continuous charge characteristics. The anode active materials may be used singly, or two or more kinds thereof may be used in any combination and in any ratio.

The particle size of the anode active material is any as long as an effect of the present invention is not significantly impaired, and in view of excellent battery characteristics such as initial efficiency, rate characteristics, cycle characteristics, or the like, it is usually 1 μm or more, preferably 15 μm or more, usually about 50 μm or less, and preferably about 30 μm or less. For example, the carbonaceous material covered with an organic matter such as pitch and then fired; the carbonaceous material on the surface of which a more amorphous carbon than the carbonaceous material is formed by chemical vapor deposition (CVD) or the like; or the like can also be suitably used as the carbonaceous material. Here, examples of the organic matter used for coating include: coal tar pitch from soft pitch to hard pitch; coal heavy oil such as dry distilled liquefied oil; straight run heavy oil such as atmospheric residual oil or vacuum residual oil; and petroleum heavy oil such as decomposed heavy oil (for example, ethylene heavy end) produced as a by-product when thermally decomposing crude oil, naphtha, or the like. A solid residue obtained by distilling these heavy oils at 200 to 400° C. which is pulverized to from 1 to 100 μm may be used. Further, a vinyl chloride resin, a phenol resin, an imide resin, or the like can also be used.

In one example embodiment of the present invention, an anode contains a metal and/or a metal oxide and carbon as an anode active material. Examples of the metal include Li, Al, Si, Pb, Sn, In, Bi, Ag, Ba, Ca, Hg, Pd, Pt, Te, Zn, La, and an alloy of two or more thereof. Two or more of these metals or alloys may be mixed and used. These metals or alloys may contain one or more non-metallic elements.

Examples of the metal oxide include silicon oxide, aluminum oxide, tin oxide, indium oxide, zinc oxide, lithium oxide, and a composite thereof. In the present example embodiment, it is preferable to include, as an anode active material, tin oxide or silicon oxide, and more preferably silicon oxide. This is because silicon oxide is relatively stable and hardly causes reaction with other compounds. For example, from 0.1 to 5% by mass of one or more elements selected from nitrogen, boron, and sulfur may be added to the metal oxide. By doing so, the electrical conductivity of the metal oxide can be improved. Electric conductivity can similarly be improved by coating a metal or a metal oxide with a conductive material such as carbon by a method such as vapor deposition.

Examples of the carbon include graphite, amorphous carbon, diamond-like carbon, carbon nanotube, and a composite thereof. Here, Graphite with high crystallinity has high electrical conductivity and is excellent in adhesiveness with respect to an anode current collector made of a metal such as copper and voltage flatness. On the other hand, since amorphous carbon having a low crystallinity has a relatively small volume expansion, such amorphous carbon has a high effect of alleviating the volume expansion of the entire anode, and deterioration due to nonuniformity such as crystal grain boundaries and defects hardly occurs.

Metals and metal oxides are characterized by their much higher lithium accepting capacity than carbon. Therefore, by using a large amount of metal and metal oxide as the anode active material, the energy density of a battery can be improved. In order to achieve high energy density, it is preferable that the content ratio of metal and/or metal oxide in the anode active material is high. As the amount of the metal and/or metal oxide increases, the capacity of the anode as a whole increases, which is preferable. The metal and/or the metal oxide is preferably contained in the anode in an amount of 0.01% by mass or more, more preferably 0.1% by mass or more, and further preferably 1% by mass or more of the anode active material. However, since metal and/or metal oxide has a large volume change when occluding or releasing lithium as compared with carbon, and electrical connection may be lost in some cases, the amount thereof is 99% by mass or less, preferably 90% by mass or less, and still more preferably 80% by mass or less. As described above, the anode active material is a material capable of reversibly accepting and releasing lithium ions with charge and discharge in the anode, and does not include another binding agent or the like.

For example, the anode active material layer can be formed into a sheet electrode by roll-forming the above-described anode active material, or a pellet electrode by compression molding, and normally, as in the case of the cathode active material layer, the anode active material layer can be manufactured by applying a coating liquid prepared by slurrying the above-described anode active material, a binding agent, and a variety of auxiliaries as needed with a solvent to a current collector and drying.

The anode binding agent is not particularly limited, and examples thereof include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, acryl, polyimide, and polyamide-imide. Examples other than those described above include styrene butadiene rubber (SBR). When an aqueous binding agent such as an SBR emulsion is used, a thickener such as carboxymethyl cellulose (CMC) can also be used. From the viewpoint of "sufficient binding force" and "high energy density" in a trade-off relationship, the amount of the anode binding agent to be used is preferably from 0.5 to 20 parts by mass with respect to 100 parts by mass of the anode active material. The anode binding agents described above may be used as a mixture thereof.

As the material of the anode current collector, a known material can be arbitrarily used, and from the viewpoint of electrochemical stability, for example, a metallic material such as copper, nickel, stainless steel, aluminum, chromium, silver, and an alloy thereof is preferably used. Among them, copper is particularly preferable from the viewpoint of ease of processing and cost. The anode current collector is preferably preliminarily roughened. Further, the shape of the current collector is also arbitrary, and examples thereof include a foil shape, a flat plate shape, and a mesh shape. A perforated type current collector such as an expanded metal or a punching metal can also be used.

The anode can be produced, for example, by forming an anode active material layer containing an anode active material and an anode binding agent on an anode current collector. Examples of the method of forming an anode active material layer include a doctor blade method, a die coater method, a CVD method, and a sputtering method. After forming the anode active material layer in advance, a thin film of aluminum, nickel or an alloy thereof may be formed by a method such as vapor deposition or sputtering, and an anode current collector may be obtained.

In order to lower the impedance, a conductive auxiliary material may be added to a coating layer containing the anode active material. As the conductive auxiliary material, scaly, soot-like, fibrous carbonaceous fine particles or the like are used, and examples thereof include graphite, carbon black, acetylene black, and vapor grown carbon fiber (VGCF (registered trademark) manufactured by SHOWA DENKO K.K.).

[2] Cathode

The cathode refers to an electrode on the high potential side in a battery, and, for example, the cathode includes a cathode active material capable of reversibly occluding and releasing lithium ions as charging and discharging, and has a structure in which the cathode active material is layered on a current collector as a cathode active material layer integrated with a cathode binding agent. In one example embodiment of the present invention, the cathode has a charging capacity per unit area of 3 mAh/cm$^2$ or more, and preferably 3.5 mAh/cm$^2$ or more. From the viewpoint of safety or the like, the charging capacity per unit area of the cathode is preferably 15 mAh/cm$^2$ or less. Here, the charging capacity per unit area is calculated from the theoretical capacity of an active material. Specifically, the charging capacity of a cathode per unit area is calculated by (the theoretical capacity of a cathode active material used for the cathode)/(the area of the cathode). Note that the area of the cathode refers to the area of one side, not both sides of the cathode.

The cathode active material in the present example embodiment is not particularly limited as long as the material can occlude and release lithium, and can be selected from several viewpoints. From the viewpoint of increasing the energy density, the cathode active material is preferably a high capacity compound. Examples of a high capacity compound include a lithium nickel composite oxide obtained by substituting a part of Ni of lithium nickelate (LiNiO$_2$) with another metal element, and layered lithium nickel composite oxide represented by the following Formula (A) is preferable.

$$\mathrm{Li}_y\mathrm{Ni}_{(1-x)}\mathrm{M}_x\mathrm{O}_2 \qquad (A)$$

(where 0≤x<1, 0<y≤1.2, and M is at least one element selected from the group consisting of Co, Al, Mn, Fe, Ti, and B.)

From the viewpoint of high capacity, the content of Ni is preferably high, and specifically, in Formula (A), x is preferably less than 0.5, and more preferably 0.4 or less. Examples of such compounds include Li$_\alpha$Ni$_\beta$Co$_\gamma$Mn$_\delta$O$_2$ (0<α≤1.2, preferably 1≤α≤1.2, β+γ+δ=1, β≥0.7, γ≤0.2), Li$_\alpha$Ni$_\beta$Co$_\gamma$Al$_\delta$O$_2$ (0<α≤1.2, preferably 1≤α≤1.2, β+γ+δ=1, β≥0.6, preferably β≥0.7, γ≤0.2), and especially LiNi$_\beta$Co$_\gamma$Mn$_\delta$O$_2$ (0.75≤β≤0.85, 0.05≤γ≤0.15, 0.10≤δ≤0.20). More specifically, for example, LiNi$_{0.8}$Co$_{0.05}$Mn$_{0.15}$O$_2$, LiNi$_{0.8}$Co$_{0.1}$Mn$_{0.1}$O$_2$, LiNi$_{0.8}$Co$_{0.15}$Al$_{0.05}$O$_2$, LiNi$_{0.8}$Co$_{0.1}$Al$_{0.1}$O$_2$, or the like can be preferably used.

From the viewpoint of thermal stability, it is also preferable that the content of Ni does not exceed 0.5, in other words, x in Formula (A) is 0.5 or more. It is also preferable that the number of specific transition metals does not exceed half. Examples of such a compound include Li$_\alpha$Ni$_\beta$Co$_\gamma$Mn$_\delta$O$_2$ (0<α≤1.2, preferably 1≤α≤1.2, β+γ+δ=1, 0.2≤β≤0.5, 0.1≤γ≤0.4, 0.1≤δ≤0.4). More specific examples thereof include LiNi$_{0.4}$Co$_{0.3}$Mn$_{0.3}$O$_2$ (abbreviated as NCM433), LiNi$_{1/3}$Co$_{1/3}$Mn$_{1/3}$O$_2$, LiNi$_{0.5}$Co$_{0.2}$Mn$_{0.3}$O$_2$ (abbreviated as NCM523), and LiNi$_{0.5}$Co$_{0.3}$Mn$_{0.2}$O$_2$ (abbreviated as NCM532) (including those in which the content of each transition metal in these compounds varies by about 10%).

Two or more compounds represented by Formula (A) may also be used as a mixture, and for example, it is also preferable to mix NCM532 or NCM523 and NCM433 in a range of 9:1 to 1:9 (typically 2:1). Furthermore, by mixing a material having a high Ni content in Formula (A) (x is 0.4 or less) and a material whose content of Ni does not exceed 0.5 (x is 0.5 or more, for example NCM433), it is possible to construct a battery with high capacity and high thermal stability.

Examples of cathode active materials other than the above include: lithium manganate having a layered structure or a spinel structure such as LiMnO$_2$, LixMn$_2$O$_4$ (0<x<2), Li$_2$MnO$_3$, LixMn$_{1.5}$N$_{0.5}$O$_4$ (0<x<2); LiCoO$_2$, or a compound obtained by replacing part of these transition metals with other metals in the compound; those lithium transition metal oxides in which Li is excessive than the stoichiometric composition; and those having an olivine structure such as LiFePO$_4$. Further, a material obtained by partially substituting these metal oxides with Al, Fe, P, Ti, Si, Pb, Sn, In, Bi, Ag, Ba, Ca, Hg, Pd, Pt, Te, Zn, La, or the like can also be used. The above-described cathode active materials can be used singly or in combination of two or more kinds thereof.

As the cathode binding agent, the same binding agent as the anode binding agent can be used. Among them, from the viewpoint of versatility and low cost, polyvinylidene fluoride or polytetrafluoroethylene is preferable, and polyvinylidene fluoride is more preferable. From the viewpoint of "sufficient binding force" and "high energy density" in a trade-off relationship, the amount of the cathode binding agent to be used is preferably from 2 to 10 parts by mass with respect to 100 parts by mass of the cathode active material.

In order to lower the impedance, a conductive auxiliary material may be added to a coating layer containing the cathode active material. As the conductive auxiliary material, scaly, soot-like, fibrous carbonaceous fine particles or the like are used, and examples thereof include graphite, carbon black, acetylene black, and vapor grown carbon fiber (such as VGCF manufactured by SHOWA DENKO K.K.).

As the cathode current collector, the same material as the anode current collector can be used. In particular, as the cathode, a current collector using aluminum, an aluminum alloy, iron, nickel, chromium, molybdenum stainless steel is preferable.

In order to lower the impedance, a conductive auxiliary material may be added to a cathode active material layer containing the cathode active material. Examples of the conductive auxiliary material include a carbonaceous fine particle such as graphite, carbon black, or acetylene black.

[3] Insulation Layer (Material and Production Method or the Like)

An insulation layer can be formed by applying a slurry composition for insulation layer in such a manner to cover a part of an active material layer of a cathode or an anode and drying and removing a solvent. Although an insulation layer may be formed on only one side of an active material layer, there is an advantage that a warpage of an electrode can be reduced when insulation layers are formed on both sides the active material layer (in particular, an a symmetrical structure).

The insulation layer slurry is a slurry composition for forming a porous insulation layer. Therefore, the "insulation layer" can also be referred to as "porous insulation layer". The insulation layer slurry is composed of nonconductive particles and a binder (binding agent) having a specific composition, and is obtained by uniformly dispersing the nonconductive particles, the binder, and optional components as solid components in a solvent.

It is desired that the nonconductive particles stably exist in an environment where a lithium ion secondary battery is used and are electrochemically stable. As the nonconductive particles, for example, a variety of inorganic particles, organic particles, and other particles can be used. Among them, inorganic oxide particles or organic particles are preferable, and in particular, from the viewpoint of high thermal stability of the particles, it is more preferable to use inorganic oxide particles. Metal ions in the particles sometimes form a salt near an electrode, which may cause an increase in the internal resistance of the electrode and a decrease in cycle characteristics of a secondary battery. Examples of other particles include particles having electrical insulation properties by subjecting the surface of fine powder of conductive metal and a compound or an oxide having conductivity such as carbon black, graphite, $SnO_2$, indium tin oxide (ITO), or metal powder to a surface treatment with nonconductive material. As the nonconductive particles, two or more of the above-described particles may be used in combination.

As the inorganic particles, inorganic oxide particles such as aluminum oxide, silicon oxide, magnesium oxide, titanium oxide, $BaTiO_2$, ZrO, alumina-silica composite oxide; inorganic nitride particles such as aluminum nitride or boron nitride; covalent crystal particles such as silicone or diamond; poorly soluble ionic crystal particles such as barium sulfate, calcium fluoride, or barium fluoride; clay fine particles such as talc or montmorillonite; or the like is used. These particles may be subjected to element substitution, surface treatment, solid solution treatment, or the like, if necessary, and may be used singly or in combination of two or more kinds thereof. Among them, inorganic oxide particles are preferable from the viewpoints of stability in an electrolyte and potential stability.

The shape of the inorganic particles is not particularly limited and may be spherical, needle-like, rod-like, spindle-like, plate-like, and from the viewpoint of effectively preventing penetration of the needle-like material, the shape is preferably plate-like.

When the inorganic particles are plate-like, in a porous membrane, it is preferable to orient the inorganic particles in such a manner that their flat surfaces are substantially parallel to the surface of the porous membrane, and by using such a porous membrane, occurrence of short circuit of a battery can be more favorably suppressed. This is presumed to be by orienting the inorganic particles as described above, since the inorganic particles are arranged in such a manner to overlap with one another on a part of the flat surface, a void (through hole) extending from one side to the other side of the porous membrane is considered to be formed not in a straight line but in a bent shape (in other words, the curvature ratio increases), which makes it possible to prevent lithium dendrite from penetrating through the porous membrane and to more favorably suppress occurrence of short circuit.

Examples of plate-like inorganic particles preferably used include various commercially available products, and for example, "SUNLOVELY" ($SiO_2$) manufactured by AGC Si-Tech Co., Ltd., a pulverized product ($TiO_2$) of "NST-B1" manufactured by ISHIHARA SANGYO KAISHA, LTD., plate-like barium sulfate "H series", "HL series" manufactured by Sakai Chemical Industry Co., Ltd., "Micron White" (Talc) manufactured by HAYASHI KASEI CO., LTD., "BEN-GEL (bentonite) manufactured by HAYASHI KASEI CO., LTD., "BMM" and "BMT" (boehmite) manufactured by KAWAI LIME INDUSTRY CO., LTD., "Serra-sur BMT-B" [alumina ($Al_2O_3$)] manufactured by KAWAI LIME INDUSTRY CO., LTD., "Seraph" manufactured by Kinsei Matec Co., Ltd. (alumina), "AKP series" (alumina) manufactured by Sumitomo Chemical Co., Ltd., "Hikawa Mica Z-20" (sericite) manufactured by Hikawa Mining Co., Ltd., and the like are available. The other $SiO_2$, $Al_2O_3$, and ZrO can be prepared by the method disclosed in Japanese Unexamined Patent Application Publication No. 2003-206475.

The average particle diameter of the inorganic particles is preferably in the range of from 0.005 to 10 μm, more preferably from 0.1 to 5 μm, and particularly preferably from 0.3 to 2 μm. When the average particle diameter of the inorganic particles is in the above range, the dispersion state of the porous membrane slurry is easily controlled, and therefore, it is easy to manufacture a uniform porous membrane having a predetermined thickness. Furthermore, the adhesiveness with a binder is improved, peeling-off of the inorganic particles is prevented even when the porous film is wound, and sufficient safety can be achieved even when the porous membrane is thinned. It is possible to suppress an increase in the particle packing ratio in the porous membrane, and therefore, it is possible to suppress a decrease in ion conductivity in the porous membrane. Still further, the porous membrane can be made thin.

Note that the average particle diameter of the inorganic particles can be obtained by arbitrarily selecting 50 primary particles in an arbitrary field of view from an SEM (scanning electron microscope) image, performing image analysis, and calculating the average value of equivalent circle diameter of each particle.

The particle diameter distribution (CV value) of the inorganic particles is preferably from 0.5 to 40%, more preferably from 0.5 to 30%, and particularly preferably 0.5 to 20%. By setting the particle diameter distribution of the inorganic particles within the above range, it is possible to maintain a predetermined gap between the nonconductive particles, and therefore, in a secondary battery of the present invention, it is possible to suppress an increase in resistance due to inhibition of movement of lithium. Note that the particle diameter distribution (CV value) of inorganic particles can be obtained by observing the inorganic particles with an electron microscope, measuring the particle diameters of 200 particles or more, determining standard deviations of average particle diameter and particle diameter, and calculating (standard deviation of particle diameter)/(average particle diameter). The larger the CV value, the larger the variation in particle diameter is.

When a solvent contained in an insulation layer slurry is a nonaqueous solvent, a polymer dispersed or dissolved in the nonaqueous solvent can be used as a binder. Examples of a polymer dispersed or dissolved in a nonaqueous solvent that can be used as a binder include polyvinylidene fluoride (PVdF), polytetrafluoroethylene (PTFE), polyhexafluoropropylene (PHFP), polytrifluorochloroethylene (PCTFE), polyperfluoroalkoxyfluoroethylene, polyimide, and polyamideimide, but are not limited thereto.

Besides these, a binder used for binding an active material layer may be used.

When the solvent contained in the insulation layer slurry is an aqueous solvent (a solution using water or a mixed solvent containing water as a main component as a dispersion medium of a binder), a polymer dispersed or dissolved in an aqueous solvent may be used as a binder. Examples of the polymer dispersed or dissolved in an aqueous solvent include an acrylic resin. As the acrylic resin, a homopolymer obtained by polymerizing one type of monomer such as acrylic acid, methacrylic acid, acrylamide, methacrylamide, 2-hydroxyethyl acrylate, 2-hydroxyethyl methacrylate, methyl methacrylate, ethylhexyl acrylate, or butyl acrylate is preferably used. The acrylic resin may be a copolymer obtained by polymerizing two or more of the above monomers. Further, the acrylic resin may be a mixture of two or more of the above homopolymers and copolymers. Other than the above-described acrylic resins, a polyolefin resin such as styrene butadiene rubber (SBR) or polyethylene (PE), or polytetrafluoroethylene (PTFE) may also be used. These polymers can be used singly or in combination of two or more kinds thereof. Among them, it is preferable to use an acrylic resin. The form of a binder is not particularly limited, and those in the form of particles (powder) may be used as they are, or those prepared in a solution state or an emulsion state may be used. Two or more kinds of binders may be used in different forms.

The insulation layer may contain a material other than the above-described inorganic filler and binder, if necessary. Examples of such a material include a variety of polymer materials that can function as a thickener for an insulation layer slurry, which will be described below. In particular, when an aqueous solvent is used, it is preferable to contain a polymer functioning as a thickener. Carboxymethyl cellulose (CMC) or methyl cellulose (MC) is preferably used as a polymer functioning as a thickener.

Although not particularly limited, the ratio of the inorganic filler in an entire insulation layer is suitably about 70% by mass or more (for example, 70% by mass to 99% by mass), preferably 80% by mass or more (for example, from 80% by mass to 99% by mass), and particularly preferably about from 90% by mass to 95% by mass.

The ratio of a binder in an insulation layer is suitably about from 1 to 30% by mass or less, and preferably from 5% by mass to 20% by mass or less. When an insulation layer-forming component other than inorganic fillers and binders, for example, a thickening agent is contained, the content ratio of the thickener is preferably about 10% by mass or less, and more preferably about 7% by mass or less. When the ratio of the binder is too small, strength (shape retentivity) of the insulation layer itself and adhesiveness to an active material layer are lowered, which may cause a defect such as cracking or peeling. When the ratio of the binder is too large, gaps between the particles of the insulation layer become insufficient, and the ion permeability of the insulation layer may decrease.

In order to maintain the conductivity of ions, it is needed to ensure that the porosity (voidage) of an insulation layer (the ratio of pore volume to apparent volume) is 20% or more, and more preferably 30% or more. However, when the porosity is too high, falling off or cracking due to friction or impact of the insulation layer occurs, it is preferably 80% or less, and more preferably 70% or less.

Note that the porosity can be calculated from the ratio of the materials constituting the insulation layer, the true specific gravity, and the coating thickness.

(Formation of Insulation Layer)

Next, a method of forming an insulation layer will be described. As a material for forming the insulation layer, a paste (including slurry form or ink form, the same applies below) mixed and dispersed with an inorganic filler, a binder, and a solvent is used.

Examples of a solvent used for insulation layer slurry include water or a mixed solvent mainly containing water. As a solvent other than water constituting such a mixed solvent, one or more kinds of organic solvents (lower alcohols, lower ketones, or the like) which can be uniformly mixed with water can be appropriately selected and used. Alternatively, the solvent may be an organic solvent such as N-methylpyrrolidone (NMP), pyrrolidone, methyl ethyl ketone, methyl isobutyl ketone, cyclohexanone, toluene, dimethylformamide, dimethylacetamide, or a combination of two or more kinds thereof. The content of the solvent in the insulation layer slurry is not particularly limited, and is preferably from 40 to 90% by mass, and particularly preferably about from 50 to 70% by mass, of the entire coating material.

An operation of mixing the inorganic filler and the binder with a solvent can be carried out by using a suitable kneading machine such as a ball mill, a homodisper, a disper mill (registered trademark), CLEARMIX (registered trademark), FILMIX (registered trademark), or an ultrasonic dispersing machine.

An operation of applying an insulation layer slurry is not particularly limited, and an existing general coating means can be used. The slurry can be applied, for example, by using a suitable coating device (gravure coater, slit coater, die coater, comma coater, dip coat, or the like) and coating a predetermined amount of insulation layer slurry to a uniform thickness.

Thereafter, a solvent in the insulation layer slurry may be removed by drying the coating material by a suitable drying means.

(Thickness)

The thickness of the insulation layer is preferably from 1 µm to 30 µm, and more preferably from 2 µm to 15 µm.

[4] Electrolyte

The electrolyte is not particularly limited, and a nonaqueous electrolyte stable at the operating potential of a battery is preferable. Specific examples of the nonaqueous electrolyte include an aprotic organic solvent such as a cyclic carbonate such as propylene carbonate (PC), ethylene carbonate (EC), fluoroethylene carbonate (FEC), t-difluoroethylene carbonate (t-DFEC), butylene carbonate (BC), vinylene carbonate (VC), or vinylethylene carbonate (VEC); a chain carbonate such as allyl methyl carbonate (AMC), dimethyl carbonate (DMC), diethyl carbonate (DEC), ethyl methyl carbonate (EMC), or dipropyl carbonate (DPC); a propylene carbonate derivative; an aliphatic carboxylic acid ester such as methyl formate, methyl acetate, or ethyl propionate; or a cyclic ester such as γ-butyrolactone (GBL). The nonaqueous electrolyte may be used singly or in combination of two or more kinds thereof. A sulfur-containing cyclic compound such as sulfolane, fluorinated sulfolane, propane sultone, or propene sultone can be used.

Specific examples of the supporting salt contained in the electrolyte include, but not limited to, a lithium salt such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$, or LiFSI. The supporting salt may be used singly or in combination of two or more kinds thereof.

[5] Separator

When a separator is included, the separator is not particularly limited, and a porous film or nonwoven fabric of polypropylene, polyethylene, fluororesin, polyamide, polyimide, polyester, polyphenylene sulfide, or polyethylene terephthalate, those obtained by adhering or joining an inorganic matter such as silica, alumina, or glass with the above as a base material, or those processed separately as nonwoven fabric or cloth can be used. As the separator, those obtained by layering the above can be used.

The present invention is not limited to the above lithium ion secondary battery and can be applied to any battery. However, in many cases, since the problem of heat often becomes a problem in batteries with high capacity, the present invention is preferably applied to batteries with high capacity, particularly lithium ion secondary batteries.

Next, an example of a method for manufacturing the electrode illustrated in FIG. 3A will be described. In the following description, a cathode 11 and an anode 12 will be described as "electrodes" without particular distinction, and the cathode 11 and the anode are merely different in materials and shapes to be used, and the following explanation is applicable to both of the cathode 11 and the anode 12.

The manufacturing method is not particularly limited as long as an electrode eventually has a structure in which an active material layer 111 and an insulation layer 112 are layered in this order on a current collector 110.

The active material layer 111 can be formed by applying a slurry mixture for active material in which an active material and a binding agent are dispersed in a solvent and drying the applied mixture for active material layer. A process of compressing and molding the dried mixture for active material layer after drying the mixture for active material layer may be further included. The insulation layer 12 can also be formed in the same procedure as the active material layer 111. The insulation layer 112 can be formed by applying a slurry mixture for insulation layer in which an insulating material and a binding agent are dispersed in a solvent and drying the applied mixture for insulation layer. A process of compressing and molding the dried mixture for insulation layer after drying the mixture for insulation layer may be further included.

The formation procedure of the active material layer 111 and the formation procedure of the insulation layer 112 described above may be carried out separately or in appropriate combination. Combining a formation procedure of the active material layer 111 and a formation procedure of the insulation layer 112 means that, for example, before drying the mixture for active material layer coated on the current collector 110, a mixture for insulation layer is coated on the applied mixture for active material layer, the entire mixture for active material layer and the mixture for insulation layer are simultaneously dried, or that, after applying and drying a mixture for active material layer, coating and drying of the mixture for insulation layer are carried out thereon, and the mixture for active material layer and the mixture for insulation layer are simultaneously compression molded. By combining the formation procedure of the active material layer 111 and the formation procedure of the insulation layer 112, a manufacturing process of an electrode can be simplified.

Figure 8A:
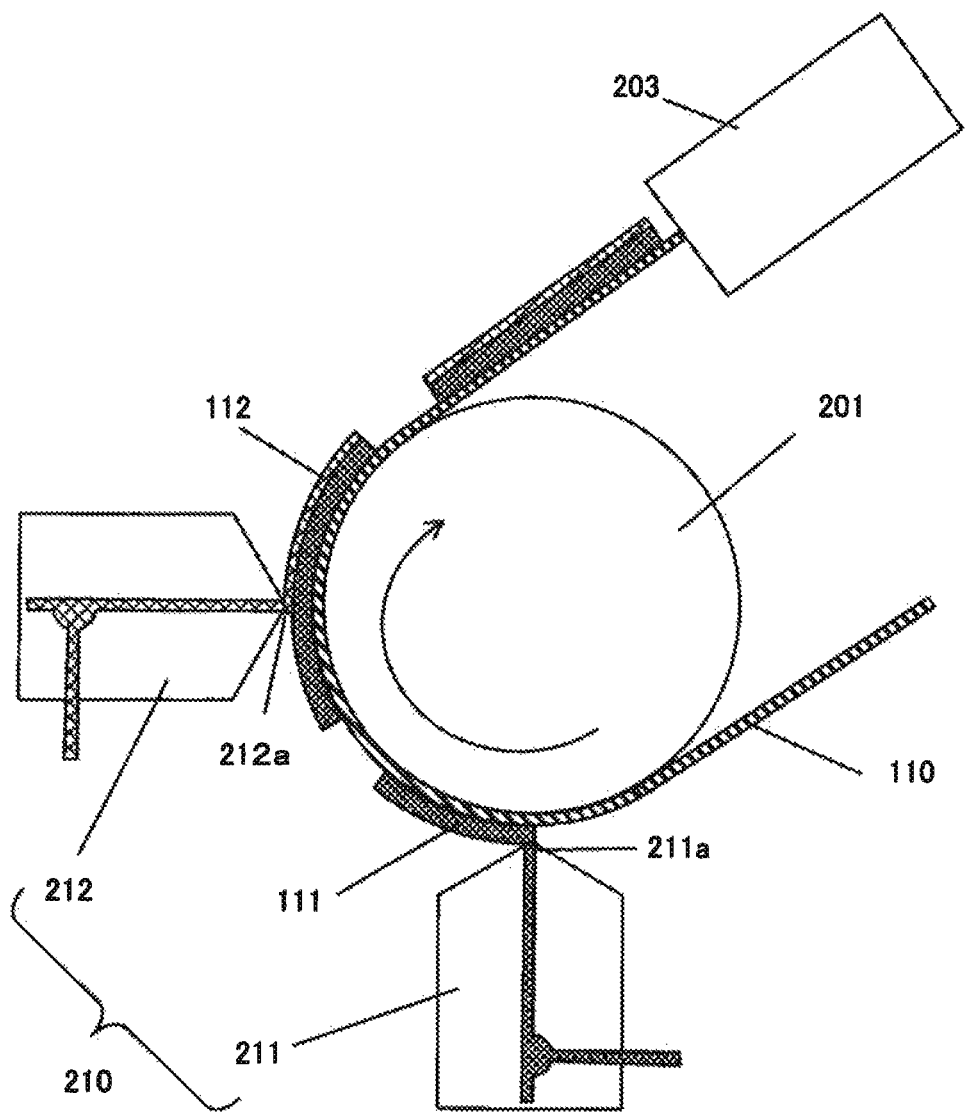
FIG. 8A is a schematic view of one example embodiment of an electrode manufacturing device.

For manufacturing an electrode, for example, the manufacturing device illustrated in FIG. 8A can be used. The manufacturing device illustrated in FIG. 8A includes a backup roller 201, a die coater 210, and a drying furnace 203.

The backup roller 201 rotates in a state in which a long current collector 110 is wound around its outer circumferential surface, thereby sending the current collector 110 in the rotational direction of the backup roller 201 while supporting the rear surface of the current collector 110. The die coater 210 has a first die head 211 and a second die head 212 which are spaced from each other in the radial direction and the circumferential direction of the backup roller 201 with respect to the outer circumferential surface of the backup roller 201.

The first die head 211 is for coating the active material layer 111 on the surface of the current collector 110, and is located on the upstream side of the second die head 212 with respect to the feed direction of the current collector 110. A discharge port 211a having a width corresponding to the coating width of the active material layer 111 is opened at the tip of the first die head 211 facing the backup roller 201, and a slurry for active material layer is discharged from the discharge port 211a. The active material layer slurry is obtained by dispersing particles of an active material and a binder (binding agent) in a solvent, and the active material and the binder dispersed in a solvent are prepared and supplied to the first die head 211.

The second die head 212 is for coating the insulation layer 112 on the surface of the active material layer 111, and is positioned on the downstream side of the first die head 211 with respect to the feed direction of the current collector 110. A discharge port 212a having a width corresponding to the coating width of the insulation layer 112 is opened at the tip of the second die head 212 facing the backup roller 201, and an insulation layer slurry is discharged from the discharge port 212a. An insulation layer slurry is obtained by dispersing insulating particles and a binder (binding agent) in a solvent, and the insulation particles and the binder dispersed in a solvent are prepared and supplied to the second die head 212.

Although a solvent is used for preparing a slurry for active material layer and for preparing an insulation layer slurry, when N-methyl-2-pyrrolidone (NMP) is used as the solvent, it is possible to increase the peeling strength of a layer obtained by evaporating a solvent as compared with the case of using an aqueous solvent. In cases in which N-methyl-2-pyrrolidone is used as a solvent, even when the solvent is evaporated in a subsequent step, the solvent does not completely evaporate, the resulting layer, although slightly, contains N-methyl-2-pyrrolidone.

The drying furnace 203 is for evaporating a solvent from a slurry for active material layer and an insulation layer slurry respectively discharged from the first die head 211 and the second die head 212, and the slurry is dried by evaporation of the solvent, and the active material layer 111 and the insulation layer 112 are obtained.

Next, a manufacturing procedure of the electrode by the manufacturing apparatus illustrated in FIG. 8A will be described. Although, for convenience of explanation, a mixture for active material layer and an active material layer obtained therefrom are not distinguished from each other and are described as "active material layer 111", actually, "active material layer 111" means a mixture for active material layer before drying. Similarly for the "insulation layer 112", the one before drying means a mixture for insulation layer.

Figure 8B:
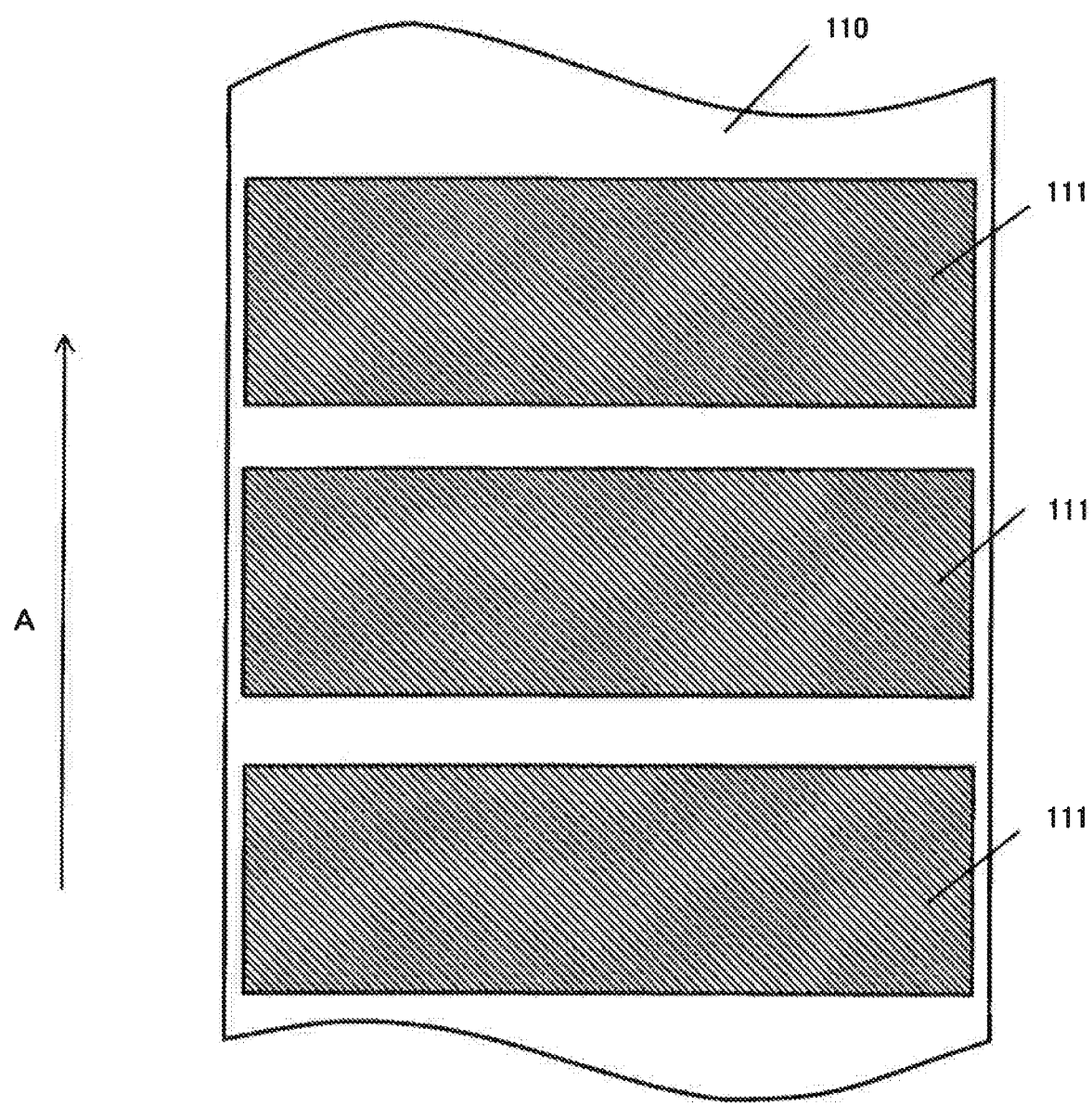
FIG. 8B is a plan view of a current collector at a stage in which an active material layer is intermittently coated on the current collector in an electrode manufacturing process by the electrode manufacturing device illustrated in FIG. 8A.

First, the active material layer 111 made into a slurry with a solvent is intermittently applied from the first die head 211 to the surface of the long current collector 110 supported and fed on the backup roller 201. As a result, as illustrated in FIG. 8B, a slurry active material layer 111 is coated on the current collector 110 at intervals in the feed direction A of the current collector 110. As the active material layer 111 is intermittently coated by the first die head 211, the active material layer 111 is applied in a rectangular shape having a longitudinal length parallel to the feed direction A of the current collector 110 and a lateral length along a direction orthogonal thereto.

Figure 8C:
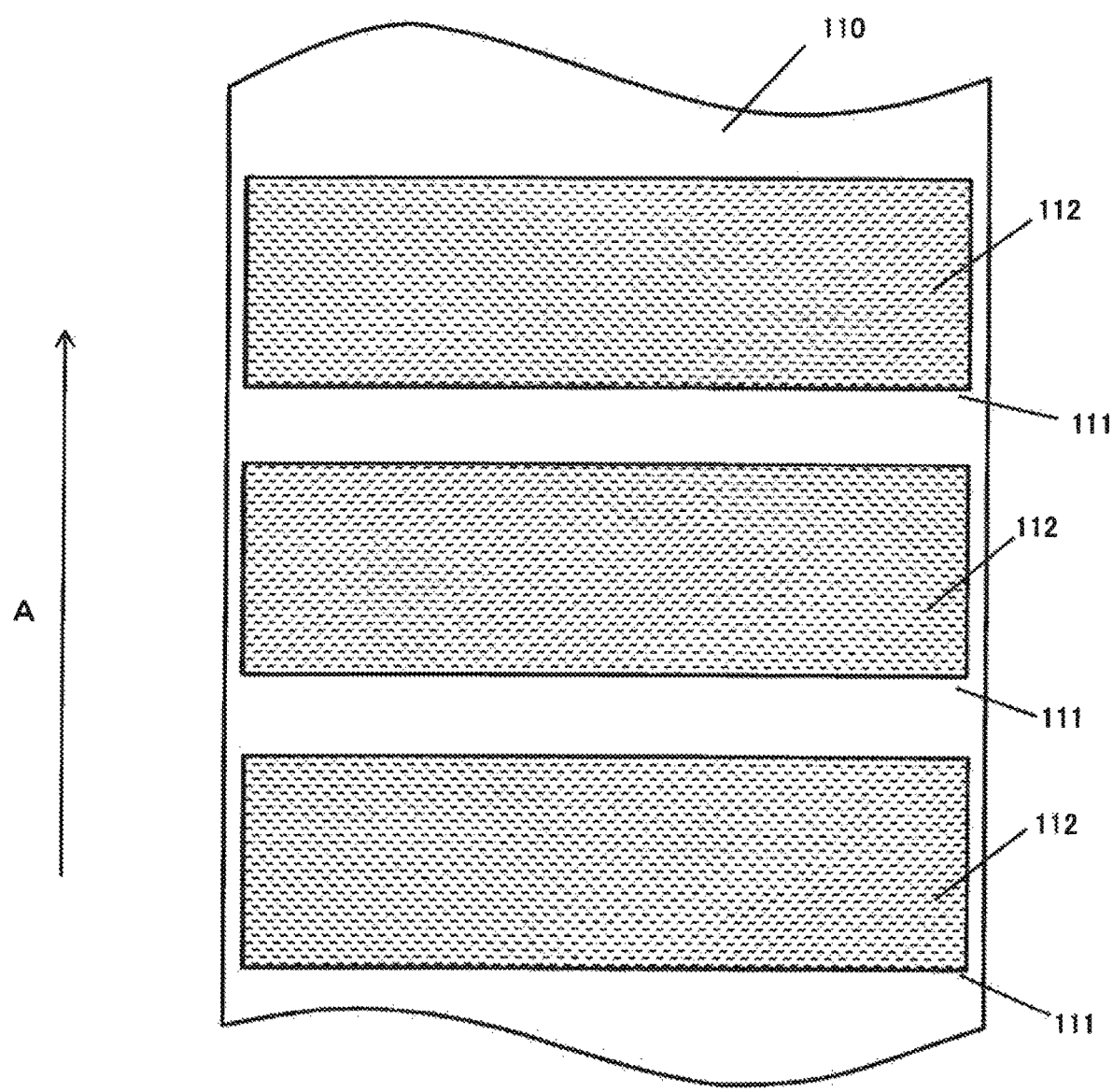
FIG. 8C is a plan view of a current collector in a stage in which an active material layer is coated on a current collector and an insulation layer is further applied in a process of manufacturing an electrode by the electrode manufacturing device illustrated in FIG. 8A.

Next, when the coated active material layer 111 is fed to a position where the leading end of the current collector 110 in the feed direction faces the discharge port 212a of the second die head 212, the insulation layer 112 slurried with a solvent is intermittently coated on the active material layer 111 from the second die head 212. By intermittently coating the insulation layer 112 with the second die head 212, the insulation layer 112 is applied in a rectangular shape having the longitudinal length parallel to the feed direction A of the current collector 110 and a lateral length along a direction orthogonal thereto, as illustrated in FIG. 8C.

In this embodiment, the width (dimension in a direction orthogonal to the feed direction A of the current collector 110) of the discharge port 211a of the first die head 211 and the discharge port 212a of the second die head 212 are equal, and the active material layer 111 and the insulation layer 112 have the same coating width.

After coating the active material layer 111 and the insulation layer 112, the current collector 110 is sent to the drying furnace 203, and in the drying furnace 203, the solvents of the active material layer slurry and the insulation layer slurry are evaporated. After evaporation of the solvents, the current collector 110 is sent to a roll press where the active material layer 111 and the insulation layer 112 are compression molded. By this, the active material layer 111 is formed simultaneously with the formation of the insulation layer 112.

Figure 8D:
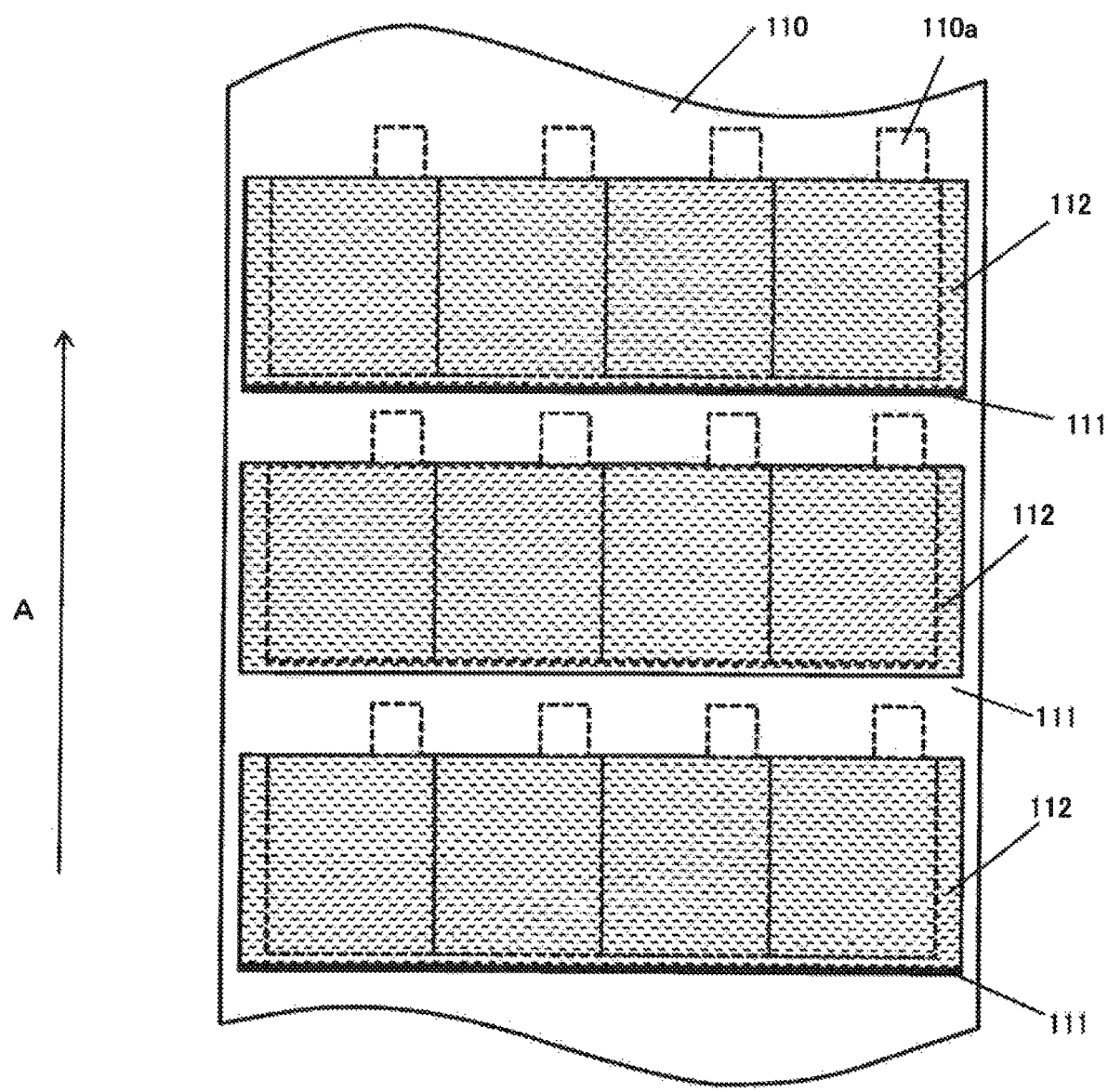
FIG. 8D is a plan view illustrating an example of a cutting shape in a stage of cutting a current collector coated with an active material layer and an insulation layer in a desired shape in a manufacturing process of an electrode.

Eventually, the current collector 110 is cut into a desired shape having, for example, a rectangular portion where the active material layer 111 and the insulation layer 112 are formed on the entire surface of the current collector 110 and an extended portion 110a formed from the current collector 110 and extending from the rectangular portion as indicated by broken lines in FIG. 8D. An electrode is thereby obtained. This cutting process may be performed in such a manner that a desired shape can be obtained by a single punching process or a desired shape can be obtained by a plurality of processes such as a combination of a cutting process and a punching process.

This cutting process may include a plurality of punching processes. The plurality of punching processes can include, for example, a first punching process for forming an electrode into a predetermined external shape and a second punching process for additionally punching, after the first punching process, a part of the external shape obtained by the first punching process. It is preferable in the second punching process to reduce a clearance between a die and a punch as compared with the first punching process, to use a top and bottom punching method, to use a counter blanking method, to use a flat pressing method, or to perform a punching process in which creation of a burr is suppressed compared to the first punching process.

The process including the first punching process and the second punching process may be performed on the cathode 11, on the anode 12, or on both of the cathode 11 and the anode 12. It is preferable that a portion processed by the second punching process is a portion where a peripheral edge of the cathode 11 and a peripheral edge of the anode 12 are close to each other when the cathode 11 and the anode 12 are facingly positioned.

An electrode assembly can be manufactured by facingly positioning the electrodes obtained as described above in such a manner that the cathode 11 and the anode 12 alternately overlap each other. The overlapping of the cathode 11 and the anode 12 involves facingly positioning the cathode 11 and the anode 12 in orientations in which a burr of the cathode 11 and a burr of the anode 12 do not face each other in a portion where at least a peripheral edge of the cathode 11 and a peripheral edge of the anode 12 are adjacent. As a result, it is possible to suppress a short circuit due to contact between the burrs. When the manufacturing procedure of at least one of the cathode 11 and the anode 12 includes the first punching process and the second punching process described above, a burr of a specific portion where a peripheral edge of the cathode 11 and a peripheral edge of the anode 12 are close to each other is suppressed, and as a result, a short circuit due to the contact between the burrs can be effectively suppressed.

The punching direction of the first punching process and the punching direction of the second punching process may be the same or opposite. When the punching direction is the same, the direction of a burr created in the first punching process is the same as the direction of a burr created in the second punching process, and when the punching direction is opposite, the direction of a burr created in the first punching process and the direction of a burr created in the second punching process are opposite to each other. In either case, when the cathode 11 and the anode 12 are facingly positioned, the cathode 11 and the anode 12 are facingly positioned in such a direction that a burr of the cathode 11 and a burr of the anode 12 do not face each other at least at a portion where a peripheral edge of the cathode 11 and a peripheral edge of the anode 12 are adjacent.

The manufacturing procedure of an electrode assembly may further include a process of joining extended portions of the cathode 11 and a process of joining extended parts of the anode 12.

Although the present invention has been described with reference to one example embodiment, the present invention is not limited to the above-described example embodiments, and can be arbitrarily changed within the scope of the technical idea of the present invention.

For example, in the above-described embodiment, a die coater 210 having two die heads 211 and 212 with discharge ports 211a and 212a opened is used as illustrated in FIG. 8A for coating the active material layer 111 and the insulation layer 112. However, it is also possible to apply the active material layer 111 and the insulation layer 112 on the current collector 110 by using a die coater having a single die head having two discharge ports arranged at intervals in the feed direction of the current collector 110 (rotational direction of the backup roller 201).

In the embodiment described above, cases where the active material layer 111 and the insulation layer 112 are coated on one side of the current collector 110 have been described. However, it is also possible to coat the active material layer and the insulation layer 112 on the other side in the same manner, and to manufacture the electrode having the active material layer 111 and the insulation layer 112 on both sides of the current collector 110.

The battery obtained according to the present invention can be used in a variety of usage forms. Some examples are described below.

[Assembled Battery]

An assembled battery can be obtained by combining a plurality of batteries. For example, an assembled battery may have a configuration in which two or more batteries according to the present example embodiment are connected in series and/or in parallel. The number of batteries in series and the number of batteries in parallel can be appropriately selected according to intended voltage and capacity of an assembled battery.

[Vehicle]

Figure 9:
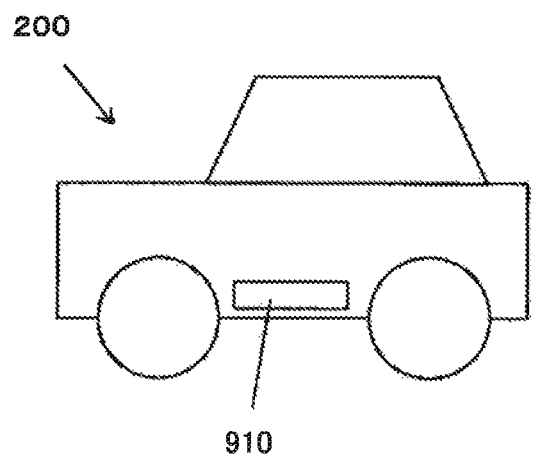
FIG. 9 is a schematic diagram illustrating an example of an electric automobile provided with a battery.

The above-described battery or an assembled battery thereof can be used for a vehicle. Examples of vehicles that can use such batteries or assembled batteries include a hybrid vehicle, a fuel cell vehicle, an electric automobile (all the above are four-wheel vehicles (a commercial vehicle such as a passenger car, a truck, or a bus, light vehicles, or the like), a bicycle (motorcycles), and a tricycle). Note that the vehicle according to the present example embodiment is not limited to an automobile, and the above-described battery or the assembled battery thereof may be used as a variety of power supplies for other vehicles, for example, a moving body such as a train. As an example of such a vehicle, FIG. 9 illustrates a schematic diagram of an electric vehicle. An electric vehicle 200 illustrated in FIG. 9 includes an assembled battery 910 configured to connect a plurality of the above-described batteries in series and in parallel and to satisfy needed voltage and capacity.

[Power Storage Device]

Figure 10:
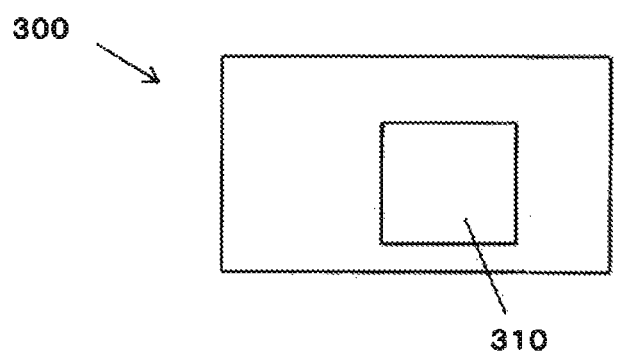
FIG. 10 is a schematic diagram illustrating an example of a power storage device including a battery.

The above-described battery or the assembled battery thereof can be used for a power storage device. Examples of a power storage device using a secondary battery or an assembled battery include those that are connected between a commercial power supply supplied to ordinary households and load of home appliances or the like and used as a backup power supply or an auxiliary power supply at the time of power outage or the like, those that stabilize power output with large time variation due to renewable energy such as photovoltaic power generation, and those that are used also for large-scale power storage. An example of such a power storage device is schematically illustrated in FIG. 10. The power storage device 300 illustrated in FIG. 10 includes an assembled battery 310 configured to connect a plurality of the above-described batteries in series and in parallel and to satisfy needed voltage and capacity.

[Others]

Furthermore, the above-described battery or the assembled battery thereof can be used as a power supply of a mobile device such as a mobile phone, or a notebook computer.

Some or all of the above-described example embodiments may also be described as the following Supplemental notes, but are not limited to the following.

[Supplemental note 1] An electrode assembly (10) for a battery, including:

at least one cathode (11) including a cathode current collector and a cathode active material layer formed in a predetermined area on at least one side of the cathode current collector, having a burr (11b) formed by a punching process, and formed in a predetermined shape; and at least one anode (12) positioned facing the cathode (11), including an anode current collector and an anode active material layer formed in a predetermined area on at least one side of the anode current collector, having a burr (12b) formed by a punching process, and formed in a predetermined shape, wherein at least one of the cathode (11) and the anode (12) further includes an insulation layer that is formed covering the active material layer, and at a section of the facing cathode (11) and anode (12) where at least a peripheral edge of the cathode (11) and a peripheral edge of the anode (12) are adjacent, the cathode (11) and the anode (12) are facingly positioned in an orientation such that the burr (11b) of the cathode (11) and the burr (12b) of the anode (12) do not face one another.

[Supplemental note 2] The electrode assembly according to [Supplemental note 1], the cathode (11) and the anode (12) are facingly positioned in such a manner to have the insulation layer of at least one of the cathode (11) and the anode (12) between the cathode active material layer and the anode active material layer.

[Supplemental note 3] The electrode assembly according to [Supplemental note 1] or [Supplemental note 2], wherein in the cathode (11), the cathode current collector has an extended portion (11a) extending from an area where the cathode active material layer is formed, and, in the anode (12), the anode current collector has an extended portion (12a) extending from an area where the anode active material layer is formed, and an extended portion (11a) of the cathode (11) and an extended portion (12a) of the anode (12) are formed at positions where the electrode assembly (10) does not overlap when viewed from a direction in which the cathode (11) and the anode (12) face.

[Supplemental note 4] The electrode assembly according to [Supplemental note 3], wherein, when the electrode assembly (10) is viewed from a direction in which the cathode (11) and the anode (12) face, the peripheral edge of the cathode (11) and the peripheral edge of the anode (12) are adjacent at a section where the peripheral edge of the cathode (11) and the peripheral edge of the anode (12) cross at the extended portion (11a) of the cathode (11) or the extended portion (12a) of the anode (12).

[Supplemental note 5] The electrode assembly according to any one of [Supplemental note 1] to [Supplemental note 4], wherein, at a section where the peripheral edge of the cathode (11) and the peripheral edge of the anode (12) are adjacent, the heights of the burrs (11b, 12b) are smaller than the other sections.

[Supplemental note 6] A battery including:

the electrode assembly according to any one of [Supplemental note 1] to [Supplemental note 5];

an electrolyte; and a packaging body for sealing the electrode assembly and the electrolyte.

[Supplemental note 7] A method of manufacturing an electrode assembly (10) for a battery, including:

a process of preparing a cathode (11) including a cathode current collector and a cathode active material layer formed in a predetermined area on at least one side of the cathode current collector; and a process of preparing an anode (12) including an anode current collector and an anode active material layer formed in a predetermined area on at least one side of the anode current collector, wherein at least one of the cathode (11) and the anode (12) further includes an insulation layer that is formed covering the active material layer, and further including:

a process of forming the cathode (11) in a predetermined shape by punching;

a process of forming the anode (12) in a predetermined shape by punching; and, a process of facingly positioning, at a section of the facing cathode (11) and anode (12) where at least a peripheral edge of the cathode (11) and a peripheral edge of the anode (12) are adjacent, the cathode (11) and the anode (12) in an orientation such that burrs (11b, 12b) created by the cutting do not face one another.

[Supplemental note 8] The method of manufacturing an electrode assembly according to [Supplemental note 7], wherein the process of facingly positioning the cathode (11) and the anode (12) includes facingly positioning the cathode (11) and the anode (12) in such a manner to have the insulation layer of at least one of the cathode (11) and the anode (12) between the cathode active material layer and the anode active material layer.

[Supplemental note 9] The method of manufacturing an electrode assembly according to [7] or [8], wherein the process of forming the cathode (11) in a predetermined shape includes forming the cathode (11) by punching in such a manner that the cathode current collector has an extended portion (11a) extending from a region where the cathode active material layer is formed, and The process of forming an anode (12) in a predetermined shape includes forming the anode (12) by punching at a position where the electrode assembly (10) does not overlap the extended portion (11a) of the cathode (11) when viewed from a direction in which the cathode (11) and the anode (12) face in such a manner that the anode current collector includes an extended portion (12a) extending from a region where the anode active material layer is formed.

[Supplemental note 10] The method of manufacturing an electrode assembly according to [Supplemental note 9], the process of facingly positioning the cathode (11) and the anode (12) includes facingly positioning the cathode (11) and the anode (12) in such a manner that the peripheral edge of the cathode (11) and the peripheral edge of the anode (12) are adjacent at a section where the peripheral edge of the cathode (11) and the peripheral edge of the anode (12) cross at the extended portion (11a) of the cathode (11) or the extended portion (12a) of the anode (12).

[Supplemental note 11] The method of manufacturing an electrode assembly according to any one of [Supplemental note 7] to [Supplemental note 10], wherein the process of forming the cathode (11) in a predetermined shape includes: performing a first punching process for forming the cathode (11) in a predetermined shape; and performing thereafter, in a section adjacent to the peripheral edge of the anode (12), a second punching process in such a manner that creation of the burr (11b) is suppressed as compared with the first punching process, and/or the process of forming the anode (12) in a predetermined shape includes: performing a first punching process for forming the anode (12) in a predetermined shape; and performing thereafter, in a section adjacent to the peripheral edge of the cathode (11), a second punching process in such a manner that creation of the burr (12b) is suppressed as compared with the first punching process.

The present invention has been described above by exemplifying the above-described example embodiments as typical examples. However, the present invention is not limited to the above-described example embodiments. In other words, in the present invention, a variety of aspects that can be understood by those skilled in the art can be applied within the scope of the present invention.

REFERENCE SIGNS LIST

1 Battery
10 Electrode assembly
10a Cathode tab
10b Anode tab
11 Cathode
11a, 12a Extended portion
11b, 12b Burr
12 Anode
13 Separator
21, 22 Packaging body
31 Cathode terminal
32 Anode terminal

The invention claimed is:

1. An electrode assembly for a battery, including:
a plurality of cathodes, each including a cathode current collector and a cathode active material layer formed in a predetermined area on at least one side of the cathode current collector, having a burr formed by a punching process, and formed in a predetermined shape; and
a plurality of anodes, each including an anode current collector and an anode active material layer formed in a predetermined area on at least one side of the anode current collector, having a burr formed by a punching process, and formed in a predetermined shape,
wherein
a plurality of the cathodes and a plurality of anodes are laminated so that the cathodes and the anodes face each other,
at least one of the plurality of the cathodes and the plurality of the anodes further include insulation layers formed covering the cathode active material layers or the anode active material layers, and
at sections of the facing cathodes and anodes where at least peripheral edges of the cathodes and peripheral edges of the anodes are adjacent, the cathodes and the anodes are facingly positioned in orientations such that the burrs of the cathodes and the burrs of the anodes do not face one another, and
at sections where the peripheral edges of the cathodes and the peripheral edges of the anodes are adjacent, the heights of the burrs are smaller than the other sections.

2. The electrode assembly according to claim 1, the cathodes and the anodes are facingly positioned in such a manner to have the insulation layers of at least one of the cathodes and the anodes between the cathode active material layers and the anode active material layers.

3. The electrode assembly according to claim 1, wherein
in the cathodes, the cathode current collectors have extended portions extending from areas where the cathode active material layers are formed, and,
in the anodes the anode current collectors have extended portions extending from areas where the anode active material layers are formed, and
extended portions of the cathodes and extended portions of the anodes are formed at positions where the extended portions do not overlap each other when viewed from a direction in which the cathodes and the anodes face.

4. The electrode assembly according to claim 3, wherein, the peripheral edges of the cathodes and the peripheral edges of the anodes are adjacent at sections where the peripheral edges of the cathode and the peripheral edges of the anodes cross at the extended portions of the cathodes or the extended portion of the anodes.

5. A battery including:
   the electrode assembly according to claim 1;
   an electrolyte; and
   a packaging body for sealing the electrode assembly and the electrolyte.

6. A method of manufacturing an electrode assembly for a battery, including:
   a process of preparing a cathode including a cathode current collector and a cathode active material layer formed in a predetermined area on at least one side of the cathode current collector; and
   a process of preparing an anode including an anode current collector and an anode active material layer formed in a predetermined area on at least one side of the anode current collector, wherein
   at least one of the cathode and the anode further includes an insulation layer that is formed covering the active material layer, and further including:
   a process of forming the cathode in a predetermined shape by punching;
   a process of forming the anode in a predetermined shape by punching; and,
   a process of facingly positioning, at a section of the facing cathode and anode where at least a peripheral edge of the cathode and a peripheral edge of the anode are adjacent, the cathode and the anode in an orientation such that burrs created by the punching do not face one another,
   wherein,
   the process of forming the cathode in a predetermined shape includes: performing a first punching process for forming the cathode in a predetermined shape; and performing thereafter, in a section adjacent to the peripheral edge of the anode, a second punching process in such a manner that creation of the burr is suppressed as compared with the first punching process, and/or
   the process of forming the anode in a predetermined shape includes: performing a first punching process for forming the anode in a predetermined shape; and performing thereafter, in a section adjacent to the peripheral edge of the cathode, a second punching process in such a manner that creation of the burr is suppressed as compared with the first punching process.

7. The method of manufacturing an electrode assembly according to claim 6, wherein the process of facingly positioning the cathode and the anode includes facingly positioning the cathode and the anode in such a manner to have the insulation layer of at least one of the cathode and the anode between the cathode active material layer and the anode active material layer.

8. The method of manufacturing an electrode assembly according to claim 6, wherein
   the process of forming the cathode in a predetermined shape includes forming the cathode by punching in such a manner that the cathode current collector has an extended portion extending from a region where the cathode active material layer is formed, and
   the process of forming an anode in a predetermined shape includes forming the anode by punching at a position where the extended portion of the cathode does not overlap when viewed from a direction in which the cathode and the anode face in such a manner that the anode current collector includes an extended portion extending from a region where the anode active material layer is formed.

9. The method of manufacturing an electrode assembly according to claim 8, the process of facingly positioning the cathode and the anode includes facingly positioning the cathode and the anode in such a manner that the peripheral edge of the cathode and the peripheral edge of the anode are adjacent at a section where the peripheral edge of the cathode and the peripheral edge of the anode cross at the extended portion of the cathode or the extended portion of the anode.

* * * * *